(12) United States Patent
Li et al.

(10) Patent No.: US 12,004,265 B2
(45) Date of Patent: Jun. 4, 2024

(54) MULTI-BAND NETWORK NODE HAVING SELECTABLE BACKHAUL/FRONTHAUL CONFIGURATIONS

(71) Applicant: NETGEAR, Inc., San Jose, CA (US)

(72) Inventors: Hsin Chung Li, Taipei (TW); Shunliang Yu, Milpitas, CA (US); Yu Te Lin, Taipei (TW); Ting Chih Tseng, Taipei (TW); Deeksha Kamath, San Jose, CA (US); Andrew Patrick Yu, Pleasanton, CA (US); Sreekar Adapa, Richmond (CA); Joseph Amalan Arul Emmanuel, San Jose, CA (US)

(73) Assignee: NETGEAR, INC., San Jose, CA (US)

( * ) Notice: Subject to any disclaimer, the term of this patent is extended or adjusted under 35 U.S.C. 154(b) by 383 days.

(21) Appl. No.: 17/574,457

(22) Filed: Jan. 12, 2022

(65) Prior Publication Data
US 2023/0239965 A1 Jul. 27, 2023

(51) Int. Cl.
| | |
|---|---|
| *H04M 1/00* | (2006.01) |
| *H04W 28/02* | (2009.01) |
| *H04W 28/086* | (2023.01) |
| *H04W 40/12* | (2009.01) |
| *H04W 72/0453* | (2023.01) |
| *H04W 88/06* | (2009.01) |

(52) U.S. Cl.
CPC ....... *H04W 88/06* (2013.01); *H04W 28/0268* (2013.01); *H04W 28/0865* (2023.05); *H04W 40/12* (2013.01); *H04W 72/0453* (2013.01)

(58) Field of Classification Search
CPC ............ H04W 88/06; H04W 28/0865; H04W 28/0268; H04W 40/12; H04W 72/0453; H04B 1/005; H04B 1/006; H04B 1/0067
See application file for complete search history.

(56) References Cited

U.S. PATENT DOCUMENTS

| | | | |
|---|---|---|---|
| 11,641,644 B2 * | 5/2023 | Badic ..................... | H04W 40/24 370/329 |
| 2023/0140587 A1 * | 5/2023 | Akl ................... | H04W 72/1268 370/235 |
| 2024/0080676 A1 * | 3/2024 | Gibson ................ | H04W 16/02 |

* cited by examiner

*Primary Examiner* — Tuan Pham
(74) *Attorney, Agent, or Firm* — Perkins Coie LLP

(57) ABSTRACT

A multi-band network node has selectable backhaul/fronthaul configurations. Network nodes provide multi-band operation to take advantage of higher Internet speeds and to support lower latency (>2 Gbps, <4 ms latency) applications. A greater Wi-Fi device count (capacity) is supported by implementing communication over additional bands. Increased bandwidth is made available between connected nodes by selectively combining backhaul throughputs. Hardware quality-of-service (QoS) is provided by splitting traffic flows for low latency and data applications. Network coverage is extended by dynamic assignment of backhaul connections and by configuring unused backhauls as fronthauls.

28 Claims, 27 Drawing Sheets

Side view　　Top view

MULTI-BAND NETWORK NODE HAVING SELECTABLE BACKHAUL/FRONTHAUL CONFIGURATIONS

FIELD

Various of the disclosed embodiments concern a multi-band network node having selectable backhaul/fronthaul configurations.

BACKGROUND

The data transfer speed of the Internet is continually increasing, making more bandwidth available to end users for their home networks. At the same time, the use of low latency applications over home networks is also increasing, especially for gaming and with the use of conference calls for people who work from home. For example, conference calls take place in real time, and the lag— or the maximum latency allowed—is about 150 to 200 milliseconds. As such, user applications increasingly operate in real time; such applications are very sensitive to latency. There are also many people who trade from home. When they do such trading, they want to sell or buy in a few milliseconds time. Thus, it is important that data is delivered across the home network with maximum throughput and very low latency.

Further, in the past a home network may have had twenty clients, but today, a typical client load in a home network is 40 to 50 clients. As such, adding additional bandwidth over the home network would help to increase the network's capacity.

Finally, the home network itself has grown from a single access point to a network of interconnected nodes. Currently, such networks must both handle traffic and coordinate their interoperation.

There are many challenges to be met in the home network to accommodate both the increase in data transfer speed and bandwidth provided by the Internet and the number of applications now in use in home networks that are sensitive to network latency.

SUMMARY

A multi-band network node has selectable backhaul/fronthaul configurations. Network nodes provide multi-band operation to take advantage of higher Internet speeds and to support lower latency (>2 Gbps, <4 ms latency) applications. A greater Wi-Fi device count (capacity) is supported by implementing communication over additional bands. Increased bandwidth is made available between connected nodes by selectively combining backhaul throughputs. Hardware quality-of-service (QoS) is provided by splitting traffic flows for low latency and data applications. Network coverage is extended by dynamic assignment of backhaul connections and by configuring unused backhauls as fronthauls.

DETAILED DESCRIPTION

Figure 1:
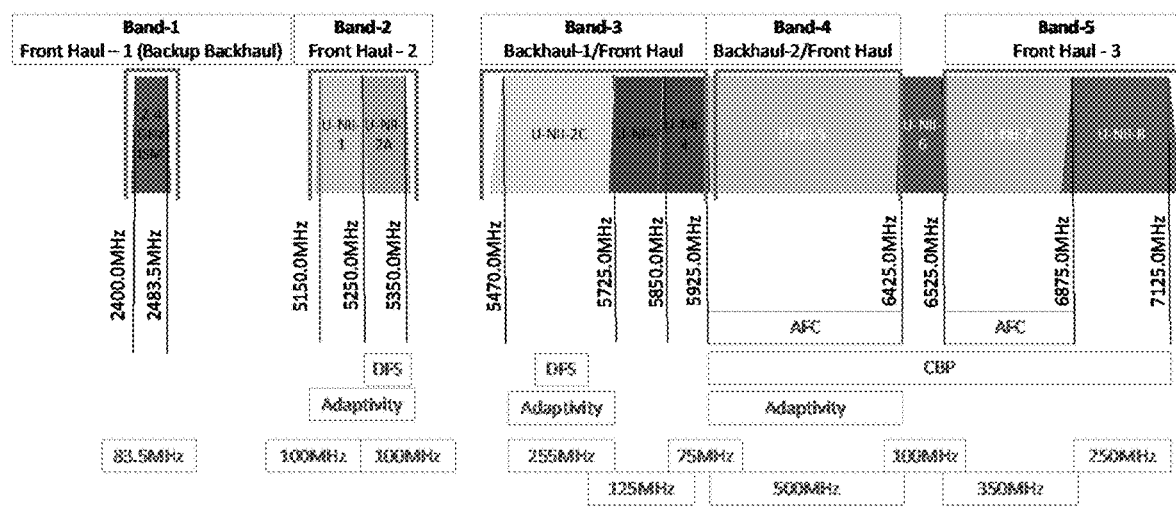
FIG. 1 shows an example of a multi-band spectrum.

Various of the disclosed embodiments concern a multi-band network node having selectable backhaul/fronthaul configurations. FIG. 1 is an example of a multi-band spectrum according to an embodiment of the invention. In FIG. 1, there are five bands: a 2.4 GHz band; a 5 GHz band or 5

GHz low band; a 5 GHz high band; a 6 GHz low band; and a 6 GHz high band. FIG. 1 shows the frequencies of each band (2400.0 MHz to 2483.5 MHz, etc.) the respective bandwidth of each band (83.5 MHz, 100 MHz, 100 MHz, and so on). Some of the bands are segregated with dynamic frequency selection (DFS), some of bands the request an automatic frequency coordination (AFC), and some of the bands implement a contention-based protocol (CBP) mechanism.

Embodiments include a feature referred to as adaptivity. Adaptivity concerns how a given radio coexists with another radio in the same location/medium. A radio with adaptivity includes a Listen Before Talk (LBT) algorithm with backoff mechanism to avoid collision.

In FIG. 1, Band-1 may be used as a backup backhaul and Band-2 and Band-3 may be operated as a backhaul and/or a fronthaul. Spectrum is provided by different regulatory boards across different regions, such as USA-FCC, CANADA-IC, and Europe-ETSI, etc. U-NII (Unlicensed National Information Infrastructure) bands mostly used by WiFi. Typically, WiFi is operated in U-NII-1, 2A, 2C, 3, 4, 5, 6, 7 & 8 bands.

In embodiments, multi-band network nodes, used as network nodes, provide multi-band operation to take advantage of higher Internet speeds and to support lower latency (>2 Gbps, <4 ms latency) applications. A greater Wi-Fi device count (capacity) is supported by implementing communication over additional bands. Increased bandwidth is made available between connected nodes by selectively combining backhaul throughputs. Hardware quality-of-service (QoS) is provided by splitting traffic flows for low latency and data applications. Network coverage is extended by dynamic assignment of backhaul connections and by configuring unused backhauls as fronthauls.

The herein disclosed multi-band network node having selectable backhaul/fronthaul configurations offers several advantages, which are categorized as three primary modes of multi-band network node operation.

One mode of operation is a high-performance mode which provides high performance between any connected network nodes. For example, in an embodiment having a minimum of two backhauls it is possible to aggregate both backhauls from each of the nodes. If each backhaul provides 2 Gbps of throughput, then the aggregate throughput provided is 4 Gbps. This mode of operation provides the highest performance.

For highest performance, embodiments replace the bandwidth of either 320 MHz or 160 MHz. Higher bandwidth provides maximum performance for short distances but is more prone to wireless interference. Every time bandwidth is double receiver sensitivity is reduced by half (3 dB). For highest performance 320/160 MHz bandwidth is considered with limitations. Those are the bandwidths available in Wi-Fi. When using high-performance mode, the nodes are very close links, e.g. the nodes are spaced, for example, twenty feet apart. Thus, it is necessary to reduce the fronthaul power to low power. Fronthaul transmit power is dynamically controlled in 1 dB Steps to have 3-6 dB overall between node fronthauls so that the nodes do not overlap when they are operating in fronthaul, i.e. so they do not interfere with each other.

In the high-performance mode, there is concurrent multi-band operation, selective backhaul and fronthaul, and hardware QoS. In such mode, operational bandwidth is 320 MHz>>>160 MHz, the fronthaul supports link budget control (TPC) (see, for example, IEEE 802.11, 802.15) and the transmitter operates in a low TX power.

In mid-performance mode selective backhaul and fronthaul are available. An application for selective backhaul and fronthaul concerns situations where 4 Gbps performance is not necessary and 2 Gbps performance is adequate. A node using one radio as a backhaul can provide 2 Gbps. In this case, the remaining backhaul can be used as a fronthaul. This keeps the network performance at mid-performance, but it extends the network coverage. In this mode of operation, the operational bandwidth can from 320 MHz to 160 MHz. For fronthaul transmission, the TX power is reduced to medium power. Fronthaul transmit power is dynamically controlled in 1 dB Steps to have 3-6 dB overall between node fronthauls. The high-performance mode requires low power because the nodes are close to each other. In the medium performance mode the nodes are spaced, for example, 40 feet apart, and the TX power is set to medium.

In the mid-performance mode, there is selective backhaul and fronthaul, but operational bandwidth is 320 MHz>>>160 MHz>>>80 MHz, the fronthaul supports link budget control (TPC), and the transmitter operates at medium TX power.

In a coverage extension mode, the network is optimized for maximum range. Throughput may be reduced from 4 Gbps to 2 Gbps, but the node-to-node distance is more than 60 to 70 feet, and the TX power is set to high.

In the coverage extension mode, there is selective backhaul and fronthaul, but operational bandwidth is 80 MHz>>>40 MHz>>>20 MHz, the fronthaul supports link budget control (TPC), and the transmitter operates at high Tx power.

Figure 2:
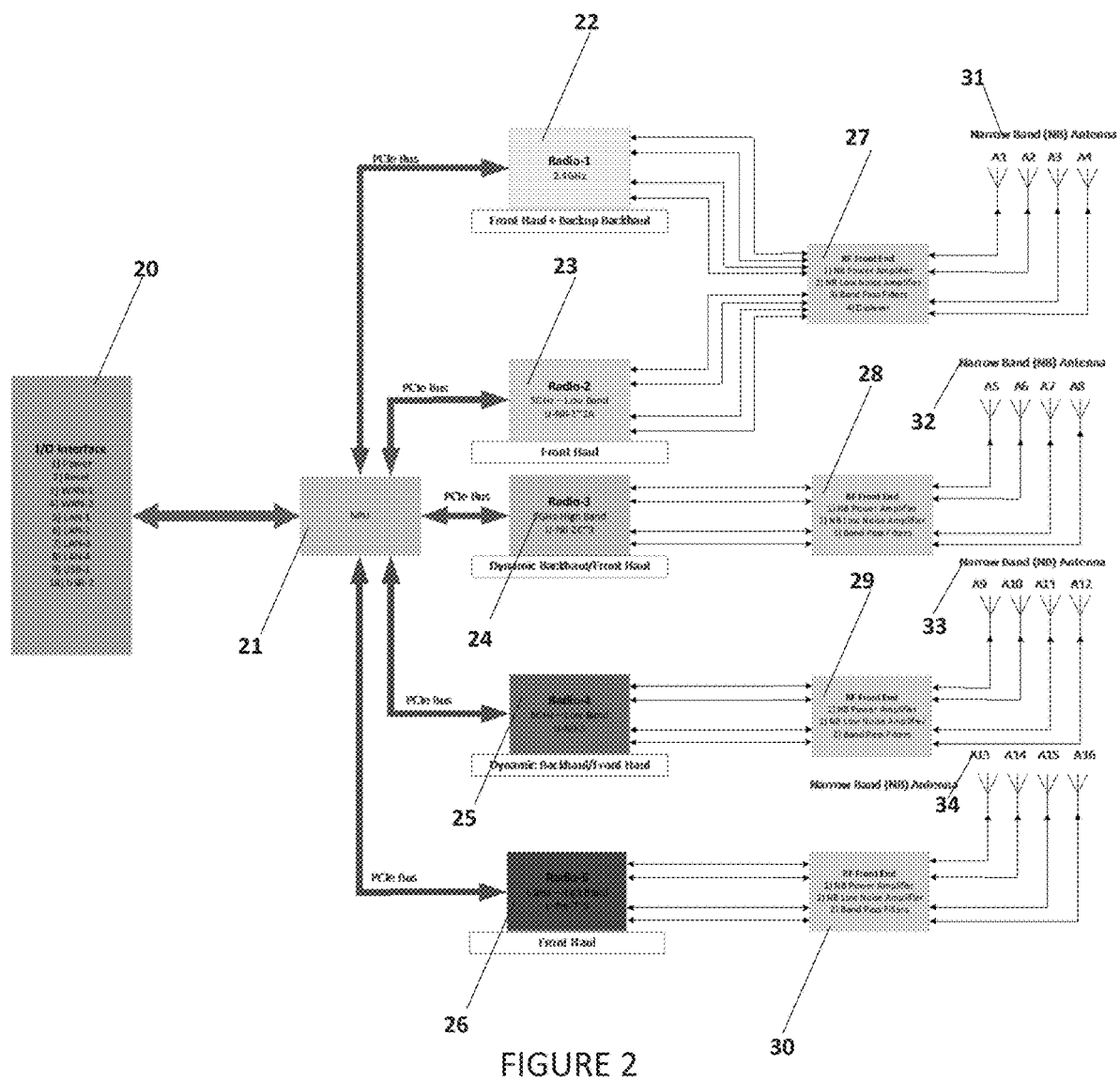
FIG. 2 shows a block diagram of a multi-band network node having selectable backhaul/fronthaul configurations.

Multi-Band Network Node Having Selectable Backhaul/Fronthaul Configurations—Hardware Design FIG. 2 shows a block diagram of a multi-band network node having selectable backhaul/fronthaul configurations. The I/O interface 20 includes, for example, power, reset, WAN-1, WAN-2 and LAN, USB, etc. The network processing unit (NPU) 21 is connected to five radios 22-26, one radio for each of the five bands, via a PCIe bus. Those skilled in the art will appreciate that embodiments of the invention may encompass any number of radios operating over any number of bands. Further, embodiments of the invention do not require a PCIe bus.

In embodiments of the invention each radio has a corresponding RF front end 27-30 that includes a power amplifier, low noise amplifier, and band pass filters. To reduce the complexity of the number of antennas, a diplexer is used for the 2.4 GHz band and the 5 GHz low band to combine the two bands to use one set of antennas 31 for both bands; the other bands have independent antennas 32-34.

Because embodiments of the invention include, e.g. five radios, there are several design challenges when operating five 36 dBm (4 watts) effective isotropic radiated power (EIRP) radios in proximity. For example there is an isolation requirement:

$$\text{Isolation} = \text{Tx Power} + \text{abs}(\text{Receiver Sensitivity})$$

$$\text{Isolation(Typical)} = 36 + \text{abs}(-95) = 131 \text{ dB}$$

In embodiments, the following techniques are used to achieve multi-band operation. Each technique gives 10-50 dB of isolation. These techniques include, for example, an isolated radio module design, isolated heatsinks, isolated power supply, use of high selectivity filters, use of a narrow band receive low noise amplifier, use of a narrow band transmit power amplifier, and isolated antenna cable routing.

Figure 3:
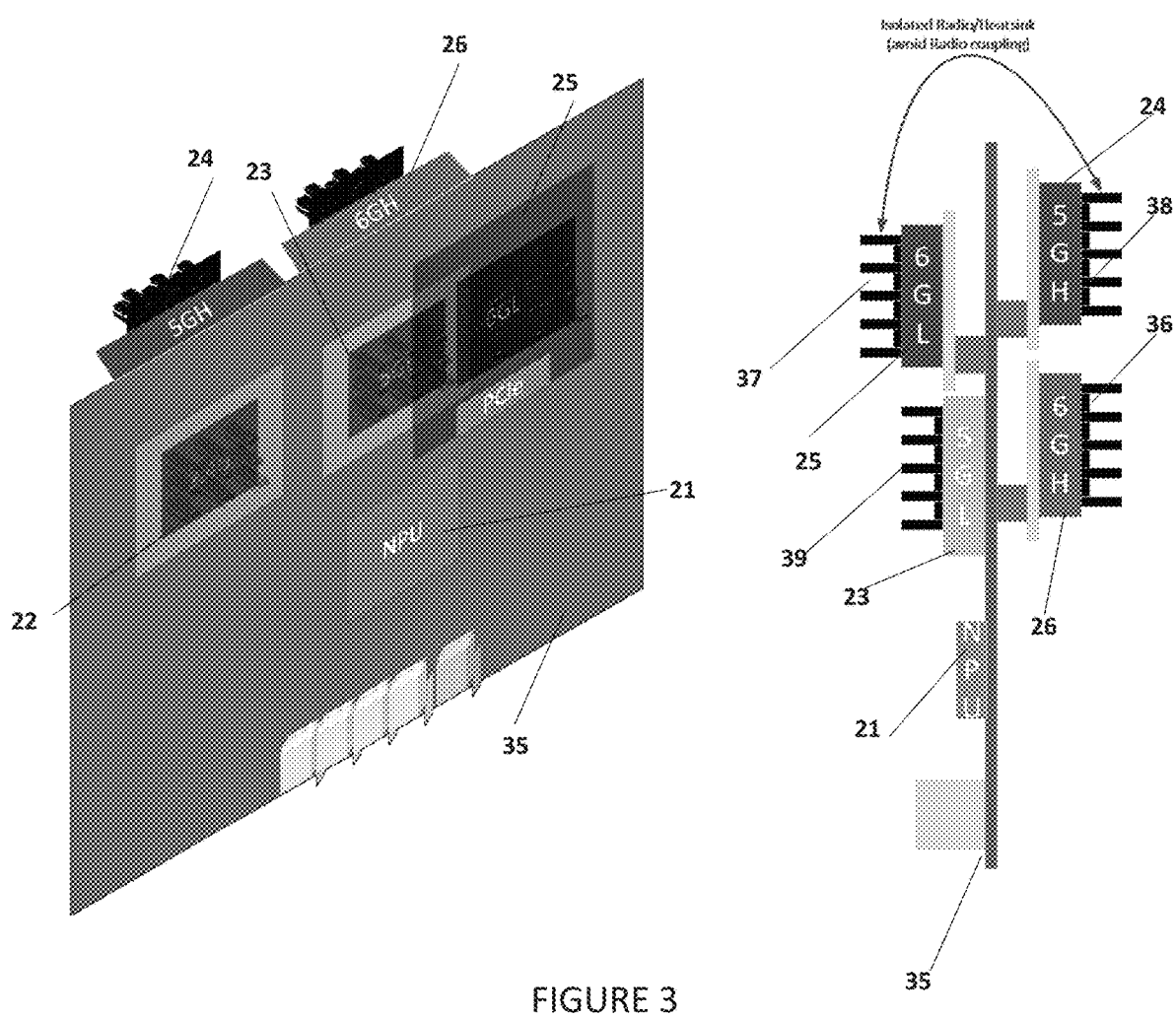
FIG. 3 shows perspective and side views of a multi-band network node having selectable backhaul/fronthaul configurations having isolated radios and heatsinks.

FIG. 3 shows perspective and side views of a multi-band network node having selectable backhaul/fronthaul configurations having isolated radios and heatsinks.

In embodiments of the invention, five radios are packaged in one network node. Consider that five radios operate at 36 dBm (4 watts). Four watts of power from each radio means that it is very challenging when the radios are situated near each other in a single package to make the radios all work concurrently without impacting each other. How this is achieved is a key aspect of the invention hardware design.

One aspect of the invention isolates the radio module design. Not every radio is put on the main system circuit board 35. There is a lot of crosstalk in such arrangement. Instead, each module is preferably mounted separately and is connected to the main system circuit board through a connector. Thus, each radio is isolated as a separate module. The radios do not crosstalk with each other because there is a ground plain in common between each of the radios.

Embodiments of the invention also employ isolated heatsinks. When a heatsink is put on any radio component or power amplifier, there is always leakage between the power amplifier to the heatsink. There is more than enough leakage to couple energy into the heatsink or even a shield cover. In such case the heatsink becomes an RF radiator. That is, it is not just radiating heat, it is also radiating perfectly for any frequency of operation. To counter this, in embodiments the heatsinks 36-39 are placed on opposite sides of the respective radio module circuit boards in a staggered fashion to avoid the possibility of energy radiated by one radio's heatsink interfering with the operation of another radio.

Figure 4:
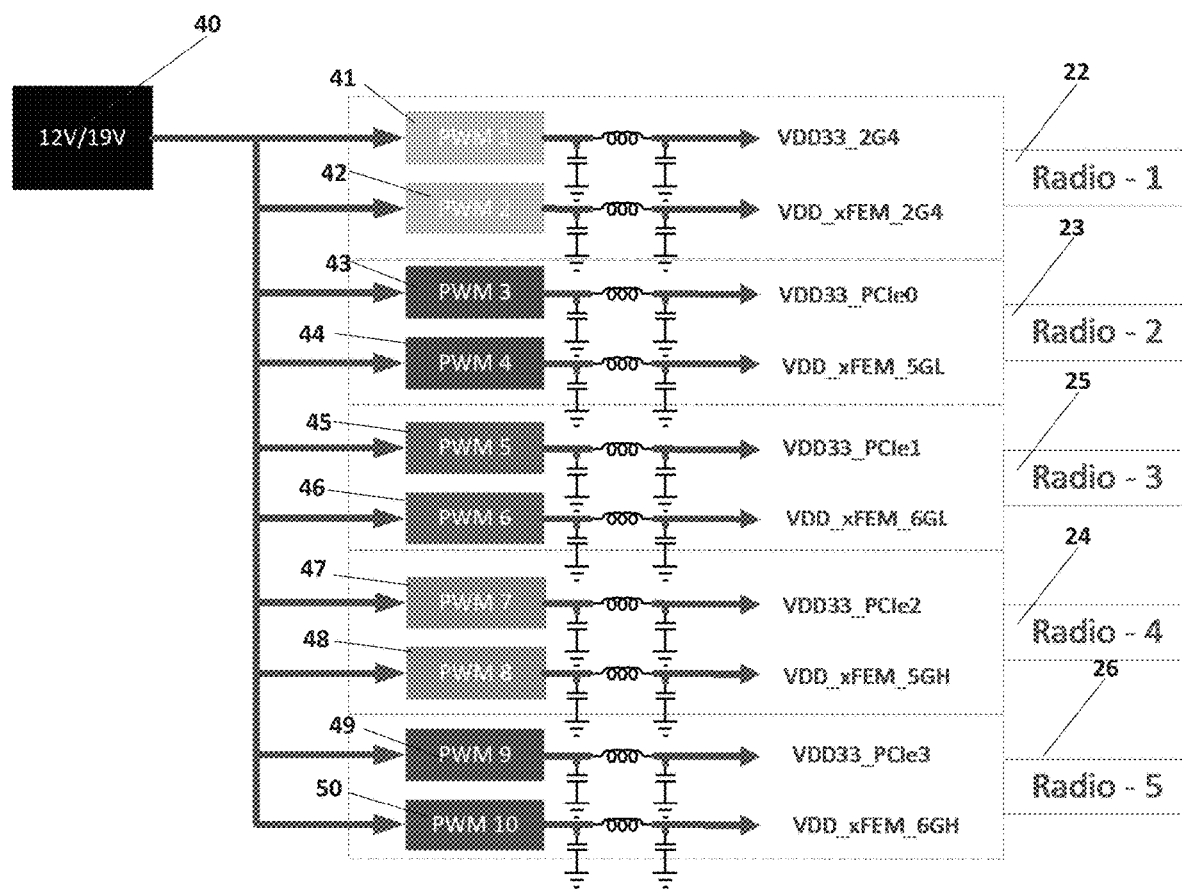
FIG. 4 is a block diagram of a multi-band network node having selectable backhaul/fronthaul configurations having isolated power supplies.

FIG. 4 is a schematic representation of a multi-band network node having selectable backhaul/fronthaul configurations and incorporating isolated power supplies for each radio. When there are multiple bands operating, if the same firewall is used to separate each radio, radio-to-radio isolation is reduced because each transmitter outputs 30 dBm power. This dBm power to the power arrays is only 20 or 30 dB lower, that means 0 dBm on the power array. That power goes back into the other radio and causes interference. With 0 dBm considered, the other radios have minus 90 dBm, 0 dBm is 90 dB low sensitivity level. Cross coupling between radios through the radio power supply section is more detrimental to the radios' concurrent operation. For example, with Radio-1 transmitting at 30 dBm the leakage transmit power through the DC power supply is only 20-30 dB lower. This means Radio-2 is subjected to Radio-1 transmit noise with a 0 dBm level with a traditional non-isolated power supply. This greatly reduces the performance of Radio-2 and vice versa to an extent of 90~100 dB. To address this, embodiments of the invention incorporate an isolated power supply for each radio. Accordingly, each radio 22-26 has its own respective power supply 41-50 connected to a common power source 40 but operating separately therefrom.

Figure 5:
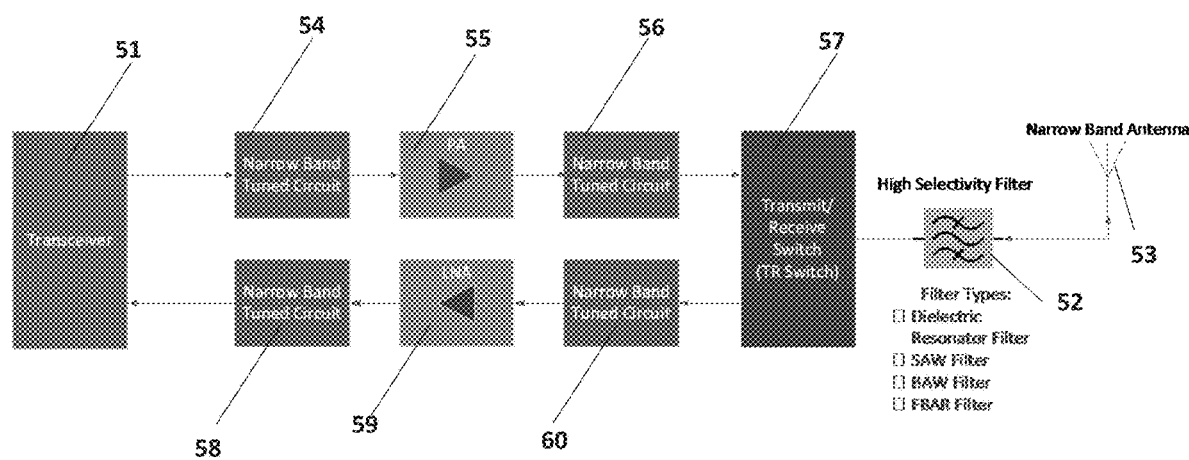
FIG. 5 is a block diagram of a multi-band network node having selectable backhaul/fronthaul configurations having a narrow band PA, LNA, filter, and antenna.

FIG. 5 is a block diagram representation of a multi-band network node having selectable backhaul/fronthaul configurations and having a narrow band PA, LNA, filter, and antenna. The isolation requirement is 36 dBm−xdB to achieve a resistance of −95 dBm, for the Rx sensitivity. As such, it is desirable to have 131 dB of isolation. As discussed, embodiments of the invention start with an isolated radio module, an isolated power supply, and an isolated heatsink. Embodiments of the invention also use a highly selective filter 52. Thus, each component, i.e. module placement, heatsink and power supply isolation, and filtering, adds 50 dB or 10 dB or 20 dB of isolation, which all adds to 131 dB of isolation.

In embodiments, it is not sufficient to provide only a filter. It is important to make sure that the system is operating with a narrow bandwidth. For example, the 5 GHz band starts at 5 GHz and goes to 7 GHz. If the system operates in that band, it is not possible to reject other bands. Accordingly, embodiments of the invention provide tuned circuits 54, 56 in the power amplifier 55 path and tuned circuits 60, 58 in low noise amplifier 59 path. These filters and tuned circuits are provided in the signal path for each band to effect additional rejection within the bands. A narrow band antenna 53 is also provided.

Figure 6:
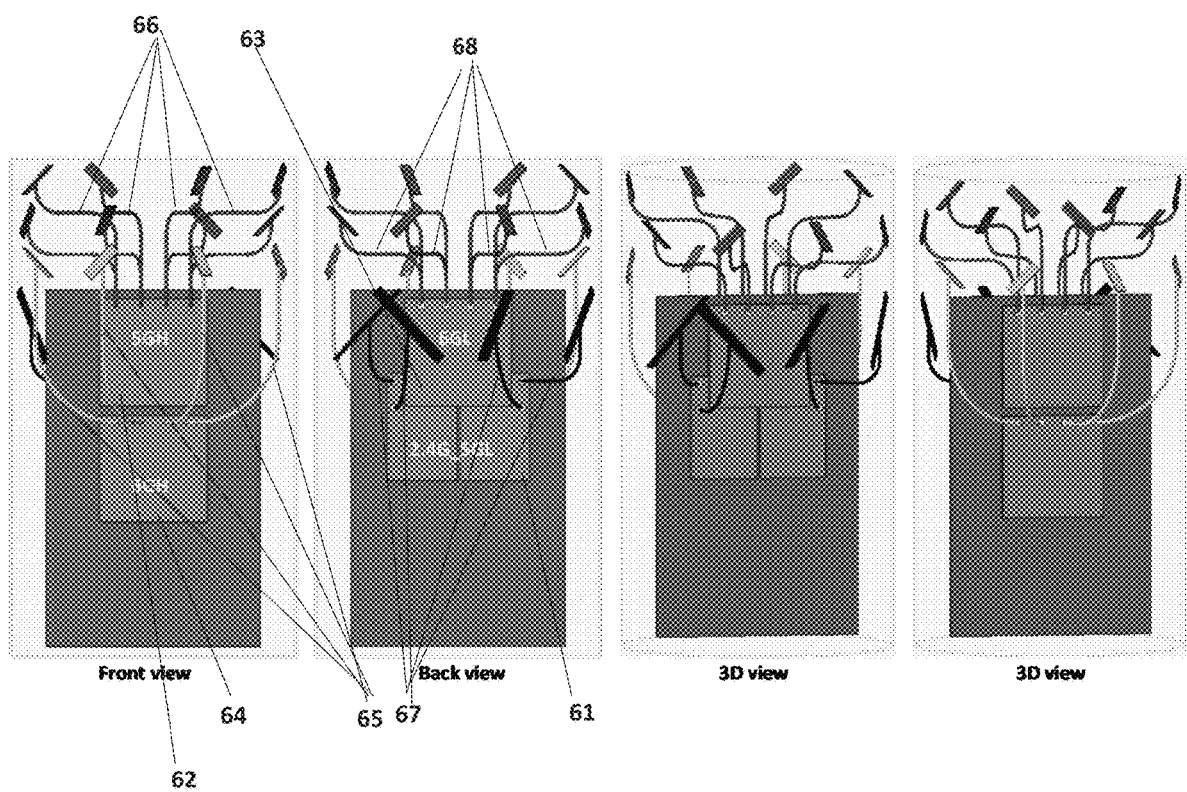
FIG. 6 shows front, back, and respective 3D views of isolated antenna cable routing in a multi-band network node having selectable backhaul/fronthaul configurations.

FIG. 6 shows front, back, and respective 3D views of isolated antenna cable routing in a multi-band network node having selectable backhaul/fronthaul configurations. In an antenna, it is not just the antenna element alone that radiates RF energy; the antenna cable, which is a part of the antenna, also radiates RF energy. Because the antenna cable carries significant current to the antenna, the antenna cable outer shield becomes a part of the antenna. For multiple bands where the antenna cables pinch each other as they are routed to their respective antennas, there is poor isolation because the cables couple the signals that they carry between each other. Embodiments of the invention isolate every cable as much as possible to get the maximum output. Thus, the antenna cables 65-68 for each of the radios 61-64 are positioned away from the cables for each of the other radios.

A further isolation feature is a software feature, referred to as a coexistence bus. In embodiments, there is coexistence for pre-wired coexistence versus a serial interface bus. The system transmits to all the radio rows, when one radio is transmitting, the other does not transmit, it receives. This typically used for Bluetooth and Wi-Fi coexistence, not for Wi-Fi-to-Wi-Fi coexistence. In multi-band WiFi systems all radios can transmit at the same time, all radios can receive at the same time, and some radios can transmit and receive at the same time, which is contrast to Bluetooth+WiFi operation where either only the Bluetooth or WiFi radio is transmitting or receiving at any given time.

Embodiments

Figure 7:
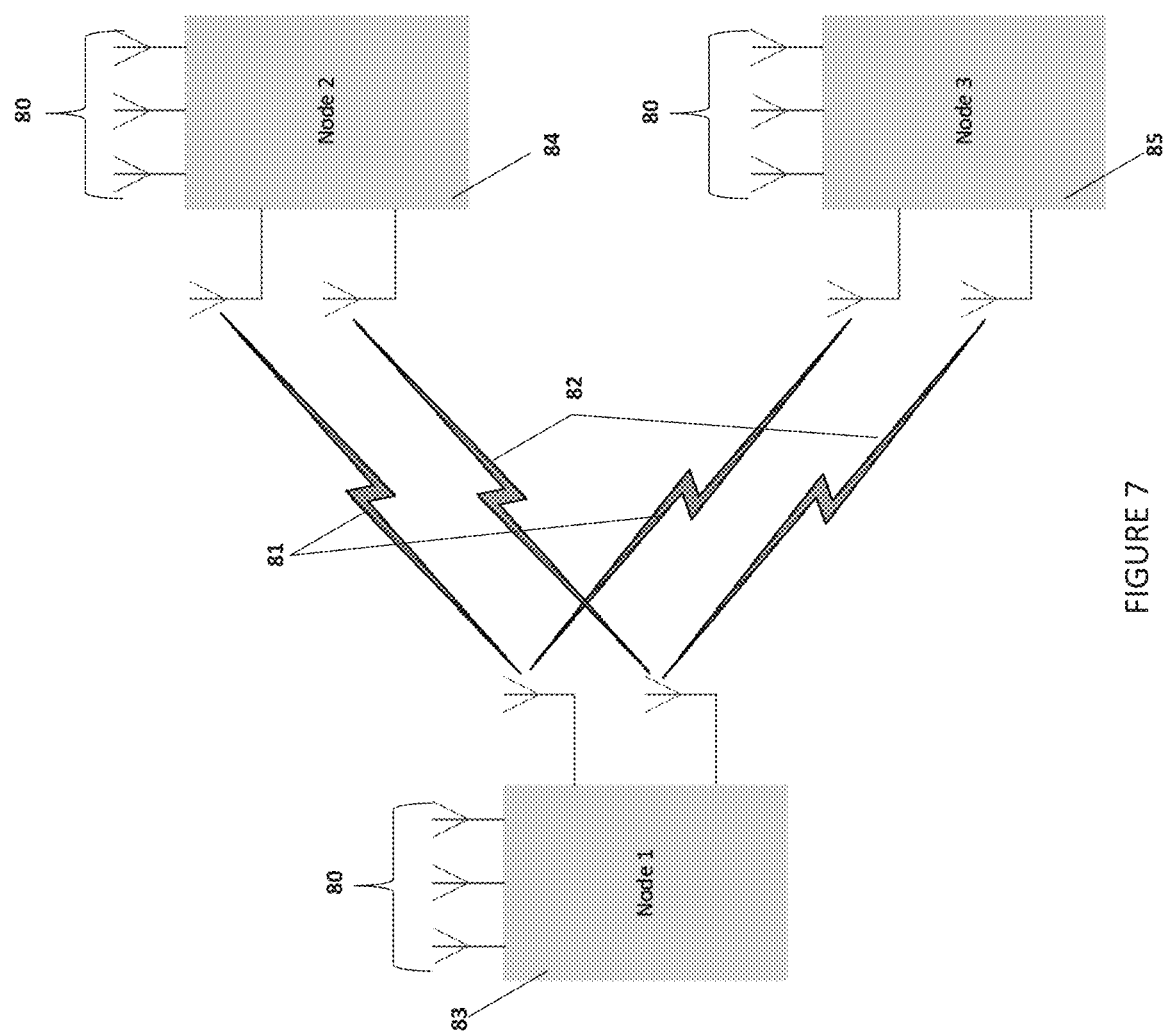
FIG. 7 shows an embodiment of the invention that provides concurrent multi-band operation (STAR)

FIG. 7 shows an embodiment of the invention that provides concurrent multi-band operation in a STAR network configuration where the throughput TPUT=TPUT 1+TPUT 2. This embodiment increases the throughput, i.e. it provides maximum throughput. Between any two nodes there are two backhauls operating simultaneously. Each backhaul provides 2 Gpbs throughput. When the backhauls are aggregated there is 4 Gpbs throughput. In FIG. 7, Node 1 (83), Node 2 (84), and Node 3 (85) each have three fronthauls 80 and two backhauls 81, 82 that together provide a combined 4 Gpbs throughput.

Figure 8:
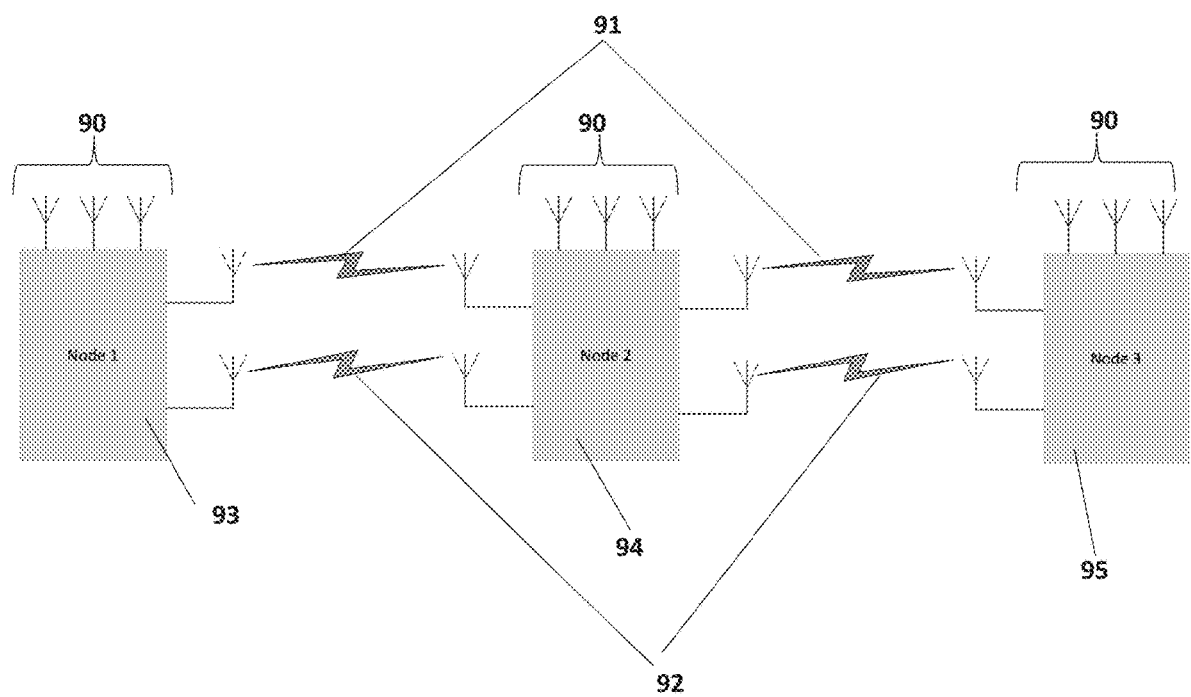
FIG. 8 shows an embodiment of the invention that provides concurrent multi-band operation (DAISY)

FIG. 8 shows an embodiment of the invention that provides concurrent multi-band operation in a DAISY network configuration where throughput TPUT=TPUT 1+TPUT 2. In FIG. 8, Node 1 (93), Node 2 (94), and Node 3 (95) each have three fronthauls 90 and two backhauls 91, 92 that together provide two throughputs, i.e. 2+2 Gpbs between any of the nodes.

Figure 9:
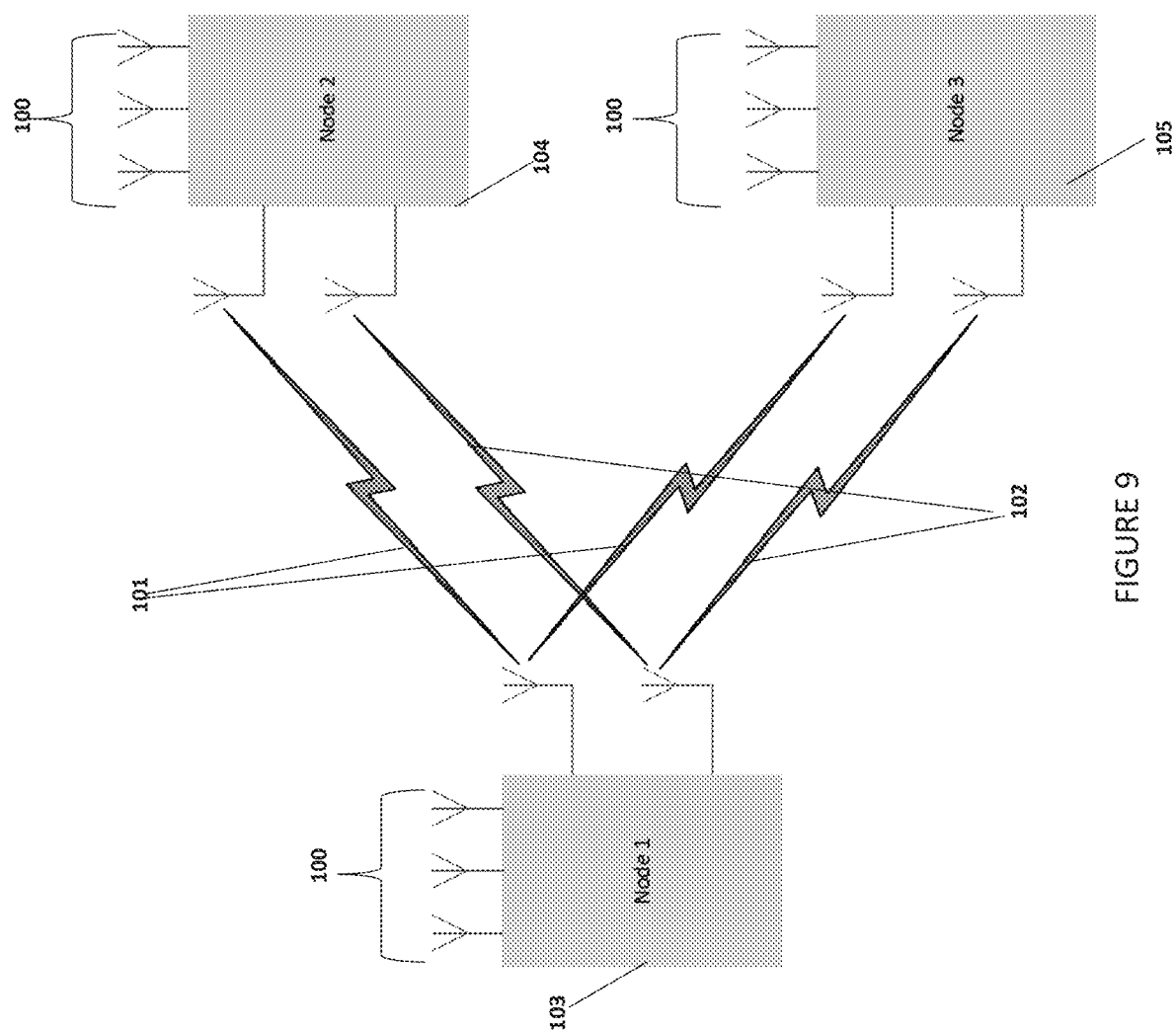
FIG. 9 shows an embodiment of the invention that provides a QoS based backhaul (STAR)

FIG. 9 shows an embodiment of the invention that provides a QoS based backhaul in a STAR network configuration. There are two backhauls going to a spreading node (103); the backhauls are split where one of the backhauls is used for low latency applications to other backhauls and the other backhaul is used for DATA applications. In FIG. 9, Node 1 (103), Node 2 (104), and Node 3 (105) each have three fronthauls 100 and two backhauls 101, 102, one of which (101) is dedicated to low latency applications and the other of which (102) is dedicated to DATA applications.

Figure 10:
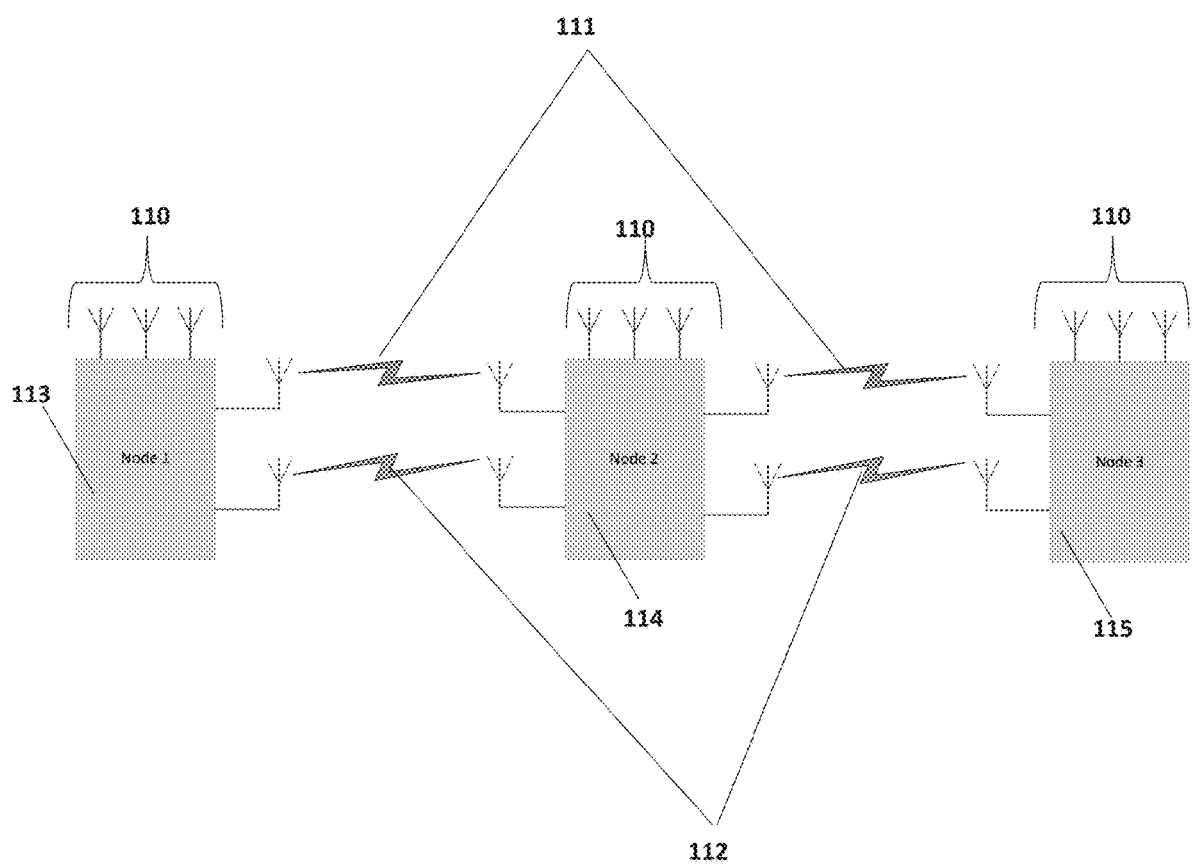
FIG. 10 shows an embodiment of the invention that provides a QoS based backhaul (DAISY)

FIG. 10 shows an embodiment of the invention that provides a QoS based backhaul in a DAISY network configuration. One backhaul is used for the lower latency applications throughout the network chain, while another backhaul is used for DATA applications throughout the network chain. In FIG. 10, Node 1 (113), Node 2 (114), and Node 3 (115) each have three fronthauls 110 and two backhauls 111, 112, one of which (111) is dedicated to low latency applications and the other of which (112) is dedicated to DATA applications.

Figure 11:
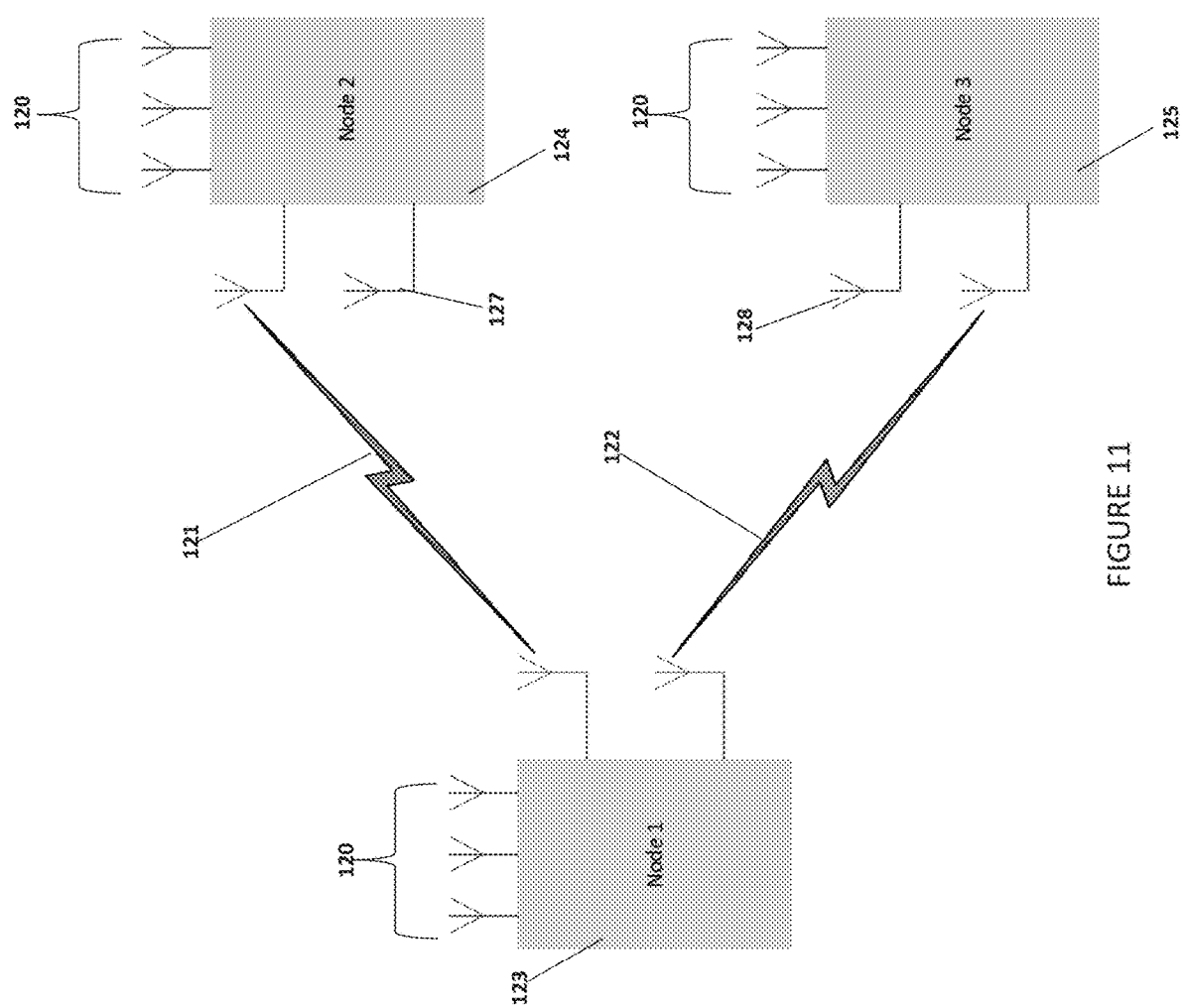
FIG. 11 shows an embodiment of the invention that provides selective backhaul (STAR) for coverage.

FIG. 11 shows an embodiment of the invention that provides selective backhaul in a STAR network configured for coverage. In a Node 1, one backhaul communicates with one of the nodes and the other backhaul communicates with the other node. At the same time, Node 2 and Node 3 use only one backhaul each to communicate with Node 1; the unused backhaul of each of Node 2 and Node 3 is used as a fronthaul. As a result, more devices can be added to each of Node 2 and Node 3. In FIG. 11, Node 1 (123), Node 2 (124), and Node 3 (125) each have three fronthauls 120 and two backhauls 121, 122. Because Node 2 and Node 3 do not use all their respective backhauls, Node 2 has an additional fronthaul 127 and Node 3 has an additional fronthaul 128.

Figure 12:
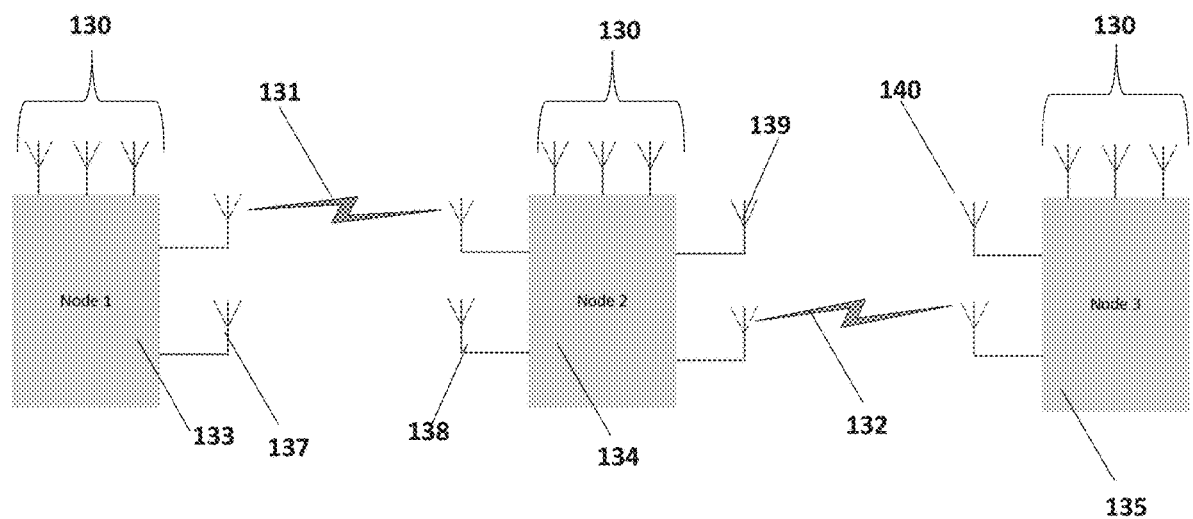
FIG. 12 shows an embodiment of the invention that provides selective backhaul (DAISY) for coverage.

FIG. 12 shows an embodiment of the invention that provides selective backhaul in a DAISY network configured for coverage. As in the DAISY chain embodiment above, each of the nodes has a STAR configuration fronthaul available. In Figure, 12 Node 1 (133), Node 2 (134), and Node 3 (135) each have three fronthauls 130 and two backhauls 131, 132. Additionally, Node 1 has one fronthaul 137, Node 2 has two fronthauls 138, 139, and Node 3 has one fronthaul 140.

Multi-Band Software

In embodiments, for selective backhaul traffic routing in a multi-band network node:
- Classify fronthaul traffic type, e.g. low latency applications or DATA applications, using any of Mirror Stream Classification Service (MSCS), Type of Service (TOS) field in IP packet headers/Diffserv Code Point (DSCP), Deep Packet Inspection (DPI);
- Based on satellite placement scenarios (High Performance, Mid Performance, Coverage Extension) to adapt to different control mechanisms;
- Control system wide parameters (operating system, switch, NPU, Wi-Fi ICs) to route traffic into different backhauls with priority.

Embodiments of the invention include different ICs and software that runs on the ICs. In embodiments, the operating system comprises an embedded Linux OS having settings that can be tuned, such as TCP window and buffer size, to allocate bandwidth on usage. An exemplary switch comprises an Ethernet switch that is embedded in SoC and the provides registers for configuring, e.g. buffer queue, traffic classification, and traffic routing. An exemplary NPU (Network Processor Unit) is embedded in SoC and controls traffic routing between different hardware elements, e.g. Wi-Fi, switch, Bluetooth, powerline, Bluetooth, etc. The NPU provides control on priorities between different hardware elements and traffic shaping. Exemplary Wi-Fi ICs include WMM settings, TWT handling, and Airtime Fairness.

In embodiments, incoming packets are subjected to a deep packet inspection that determines whether the packet is from a real time application or a DATA application. If the packet is from a DATA application it is routed to one of the backhauls, e.g. a backhaul that is dedicated to DATA transfer, if the packet is from a real time application it is routed to another one of the backhauls, e.g. a backhaul that is dedicated to low latency applications. When the nodes are close to each other maximum throughput can be selected and each packet goes through both backhauls at the same time. There is no segregation of data.

Multi-band traffic routing is shown in Table 1 below, which provides a summary of traffic dispatching scenarios.

TABLE 1

TRAFFIC DISPATCHING SCENARIOS

| | Traffic Dispatching | |
|---|---|---|
| | Backhaul-1 | Backhaul-2 |
| High Performance Aggregated Backhaul | Low Latency + Data | Low Latency + Data |
| Mid Performance QoS Based Backhaul | Low Latency | Data |
| Coverage Extension Selective Backhaul | Low Latency + Data | Low Latency + Data |

As can be seen from Table 1, multi-band traffic routing provides three traffic dispatching scenarios:

High Performance, in which:

Both backhauls are available and aggregated;

Traffic is either equally dispatched or based on selective traffic flow between two backhauls;

Low latency packets are routed with priority and assured to avoid packets getting dropped; and Data packets are routed with allowing random packet dropping when resources limited or congested.

Mid Performance, in which:

Both backhauls are available, where one backhaul is dedicated for low latency packets and the other backhaul is dedicated for data packets.

Coverage Extension, in which:

Only one selective backhaul is available;

Low latency packets are routed with priority and assured to avoid packets being dropped;

Data packets are routed with allowing random packet dropping when resources limited or congested.

Figure 13:
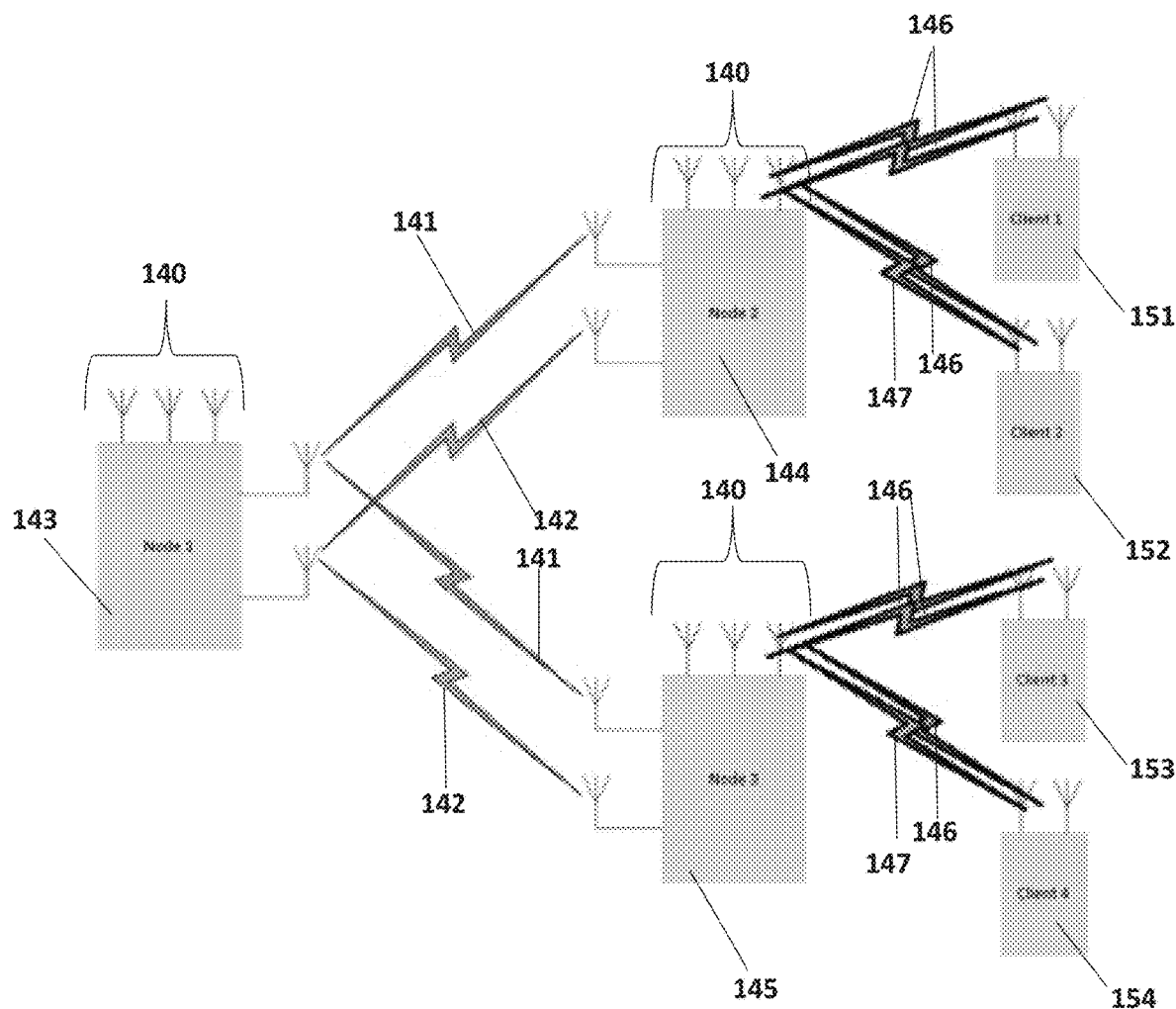
FIG. 13 shows an embodiment of the invention that provides a QoS based backhaul (STAR)

FIG. 13 shows an embodiment of the invention that provides a QoS based backhaul in a STAR network configuration.

In FIG. 13, Node 1 (143), Node 2 (144), and Node 3 (145) each have three fronthauls 140 and two backhauls 141, 142 that together provide two throughputs. One backhaul (141) is dedicated to handling packets for to low latency applications; the other backhaul (142) is dedicated to handling packets for DATA applications. In this STAR network configuration, two of the nodes 144, 145 handle traffic for Client 1 (151), Client 2 (152), Client 3 (153), and Client 4 (154), where packets for low latency applications are handled via a first fronthaul 146 and packets for data applications are handled via a second fronthaul 147.

Table 2 below provides a summary of QoS based backhaul in a STAR network configuration showing designated routing paths.

TABLE 2

QoS BASED BACKHAUL (STAR), DESIGNATED ROUTING PATHS

| Backhaul | | Designated Routing paths | | | |
|---|---|---|---|---|---|
| | | Node 2 | | Node 3 | |
| Node 1 <> Node 2 | Node 1 <> Node 3 | Client 1 | Client 2 | Client 3 | Client 4 |
| Low latency Application | DATA Application | Low latency Application | DATA Application | DATA Application | DATA Application |
| | | Low latency Application | Low latency Application | DATA Application | Low latency Application |

Figure 14:
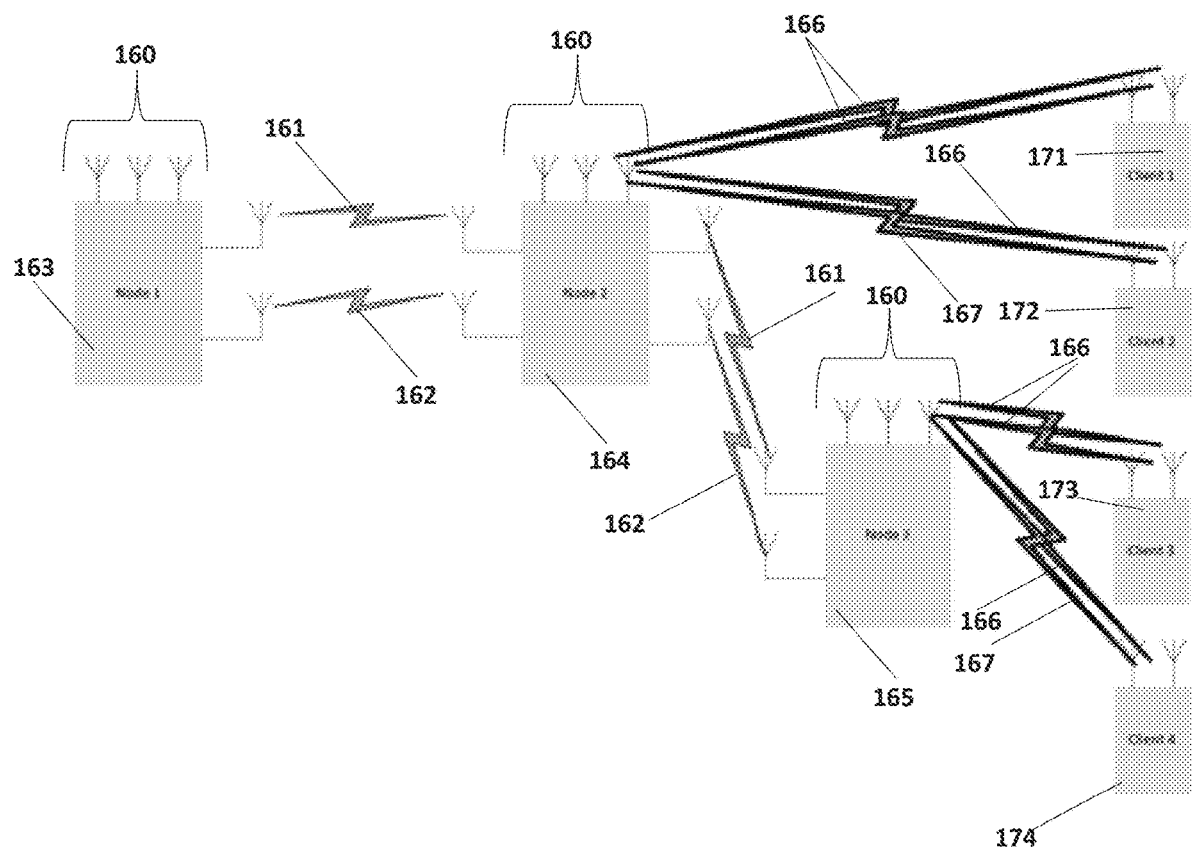
FIG. 14 shows an embodiment of the invention that provides a QoS based Backhaul (DAISY.

FIG. 14 shows an embodiment of the invention that provides a QoS based backhaul in a DAISY network configuration. In FIG. 14, Node 1 (163), Node 2 (164), and Node 3 (165) each have three fronthauls 160 and two backhauls 161, 162 that together provide two throughputs. One backhaul (161) is dedicated to handling packets for to low latency applications; the other backhaul (162) is dedicated to handling packets for DATA applications. In this DAISY architecture, two of the nodes 164, 165 handle traffic for Client 1 (171), Client 2 (172), Client 3 (173), and Client 4 (174), where packets for low latency applications are handled via a first fronthaul 166 and packets for data applications are handled via a second fronthaul 167. Note that in this embodiment Node 2 provide backhaul connections to both of Node 1 and Node 3.

Table 3 below provides a summary of QoS based backhaul in a DAISY network configuration showing designated routing paths.

TABLE 3

QoS BASED BACKHAUL (DAISY), DESIGNATED ROUTING PATHS

| Backhaul | | Designated Routing paths | | | |
|---|---|---|---|---|---|
| | | Node 2 | | Node 3 | |
| Node 1 <> Node 2 | Node 2 <> Node 3 | Client 1 | Client 2 | Client 3 | Client 4 |
| Low latency Application | DATA Application | Low latency Application | DATA Application | DATA Application | DATA Application |
| | | Low latency Application | Low latency Application | DATA Application | Low latency Application |

Antenna

Figure 15A:
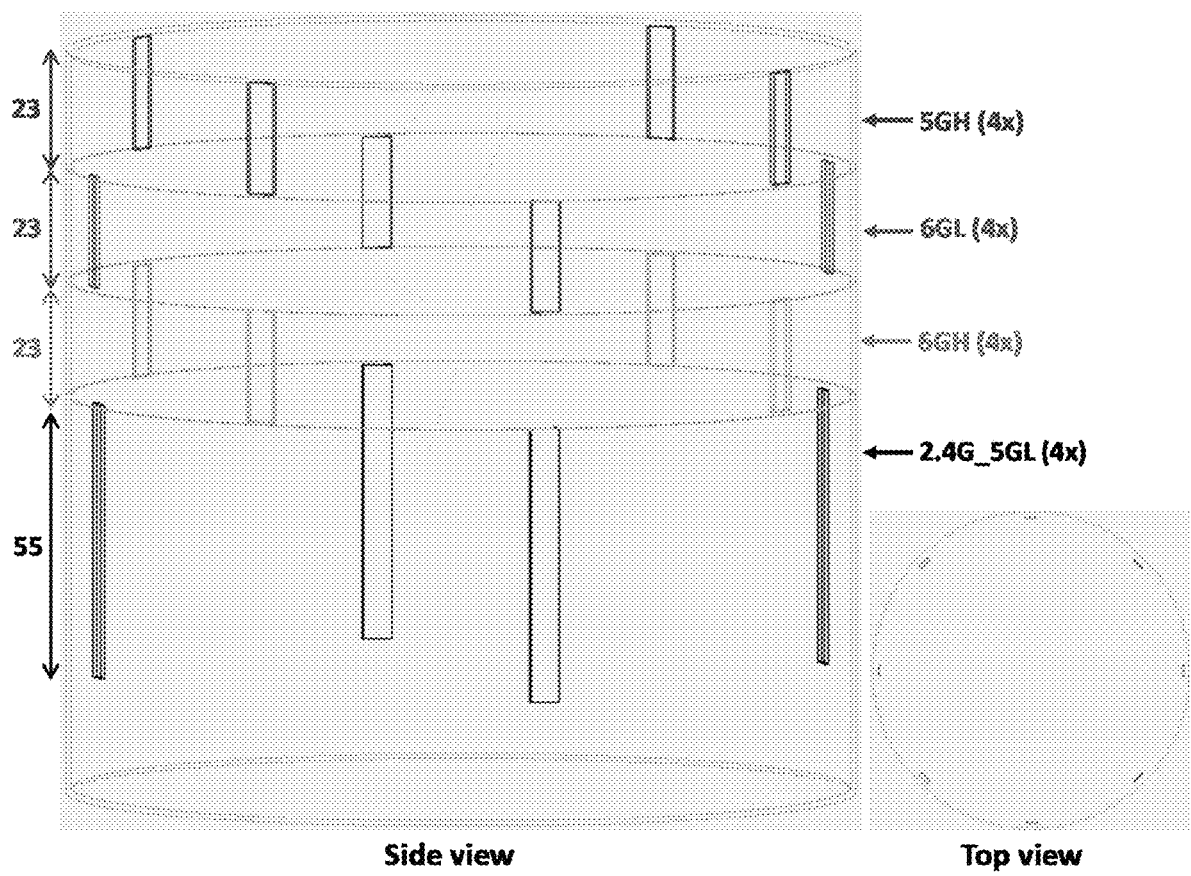
FIGS. 15A and 15B show side views and top views of antenna placement in a multi-band network node having selectable backhaul/fronthaul configurations, the antennas having a same polarization antenna configuration (FIG. 15A) or an orthogonally polarized antenna configuration (FIG. 15B)
Figure 15B:
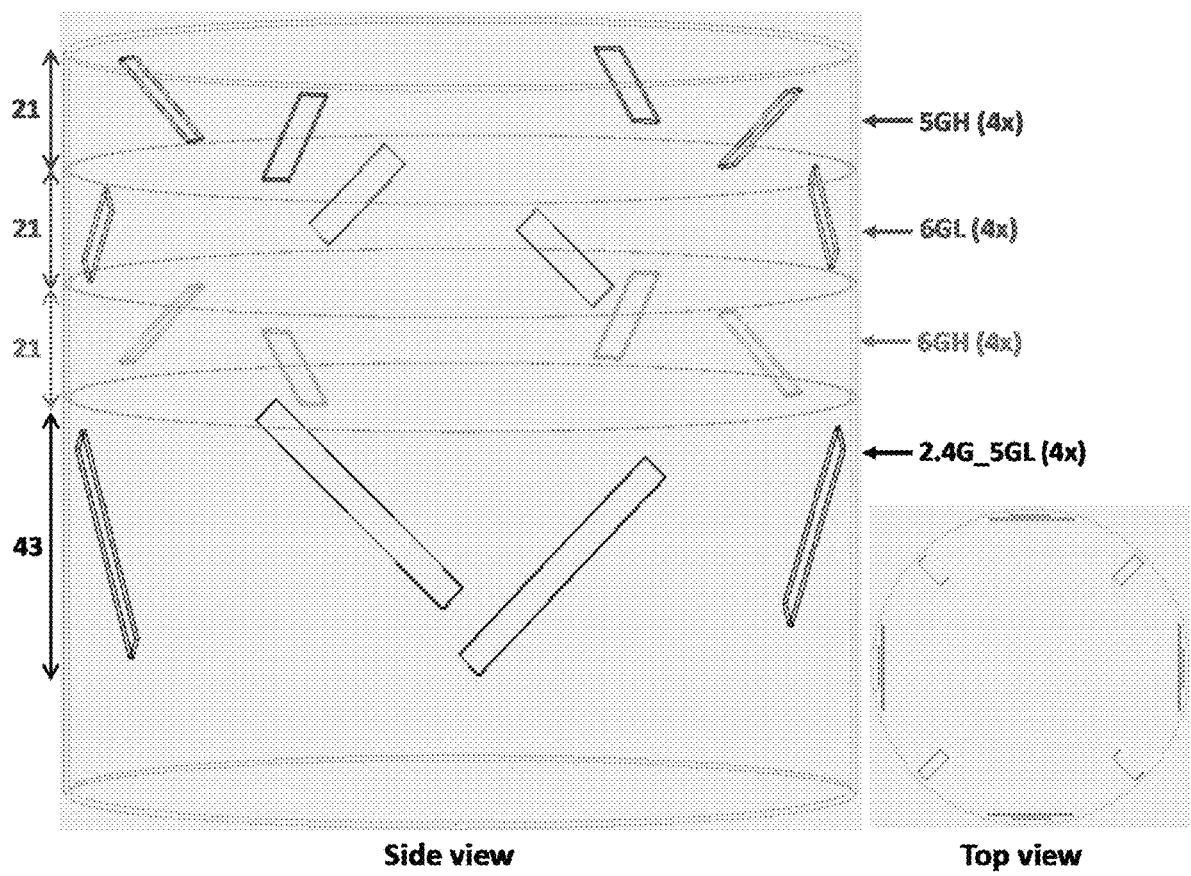

FIGS. 15A and 15B show side views and top views of antenna placement in a multi-band node, the antennas having a same polarization antenna configuration (FIG. 15A) or an orthogonally polarized antenna configuration (FIG. 15B). In an embodiment, the dimensions of the device are 160 mm (diameter)×250 mm (height). An exemplary multi-band node has four antenna arrays including a four element 5GH antenna (62) at 21 mm (height); a four element 6GL antenna (63) 21 mm (height); a four element 6GH antenna (63) at 21 mm (height); and a four element 2.4G/5GL antenna (61) at 43 mm (height). The antennas are of a narrow band design and have frequency ranges of 5GH (5490~5925 MHz); 6GL (5925~6425 MHz); 6GH (6585~7125 MHz); 5GL (5170~5330 MHz); and 2.4G (2400~2500 MHz).

Typically, vertical polarization is used for arrangements having sixteen antennas. The antenna, for example a dipole antenna, which has a donut shaped radiation pattern is normally used. Usually, better isolation results depend on the spacing between any of the respective antennas. To get the maximum isolation between any same band antenna, the antenna elements can be arranged orthogonal to each other. In the parallel arrangement, the donut shaped radiation pattern of each antenna overlaps, which means that the antennas couple to each other and result in a poor isolation. In the orthogonal arrangement, the antennas are in optimal polarization and the peak point of the radiation pattern of one antenna coexists with the null point, maybe 10 dB or 20 dB lower, of the other antenna. The antennas do not couple to each other, which gives additional isolation on the network.

Embodiments of the invention provide a coupling feed unbalance dipole antenna which has narrow bandwidth. The signal feeds in the shorter L-shaped strip couple to the top straight strip. The longer L-shaped strip is the negative electrode of the signal. The resonated frequency is controlled with the parameters "L1" and "L2." Impedance matching of the antenna is optimized with the parameters "F" and "G", resulting in narrow bandwidth.

The traditional dipole antenna without coupling feed has a wideband result and cannot be used for the desired band. In embodiments of the invention, a narrow bandwidth is achieved by designing the coupling feed instead. In this way, the antenna can be made more selective with the desire frequency. According to a simulated result, a narrow bandwidth antenna is presented and each antenna is designed in the desired band (5GH/6GL/6GH/2.4G_5GL).

In FIG. 15A, an exemplary same polarization antenna system has the following specifications:
Device: 160 mm (diameter)×150 mm (height)
5GH antenna: 23 mm (height)
6GL antenna: 23 mm (height)

6GH antenna: 23 mm (height)
2.4G_5GL antenna: 55 mm (height)
Narrow band design with below antennas
5GH (5490~5925 MHz)
6GL (5925~6425 MHz)
6GH (6585~7125 MHz)
5GL (5170~5330 MHz)

In FIG. 15B an exemplary orthogonally polarized antenna configuration has the following specifications;
Device: 160 mm (diameter)×150 mm (height)
5GH antenna: 21 mm (height)
6GL antenna: 21 mm (height)
6GH antenna: 21 mm (height)
2.4G_5GL antenna: 43 mm (height)
Narrow band design with below antennas
5GH (5490~5925 MHz)
6GL (5925~6425 MHz)
6GH (6585~7125 MHz)π
5GL (5170~5330 MHz)
2.4G_5GL (2400~2500 MHz, 5170~5330 MHz)

Orthogonal polarization placement provides for better isolation (>25).

Figure 16A:
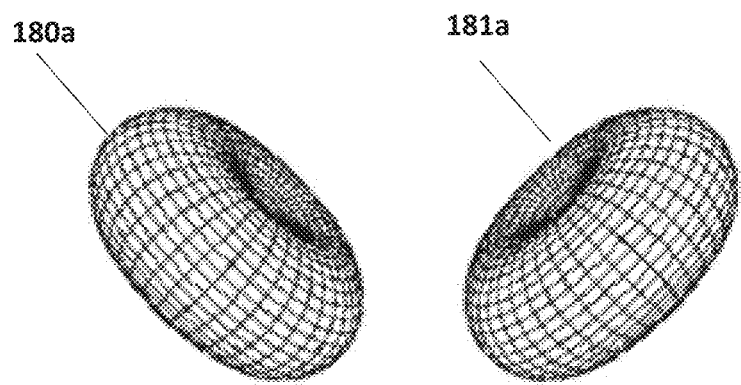
FIGS. 16A and 16B shows a perspective view of antennas having same antenna polarization (FIG. 16B) and orthogonal (FIG. 16A) antenna polarization.
Figure 16B:
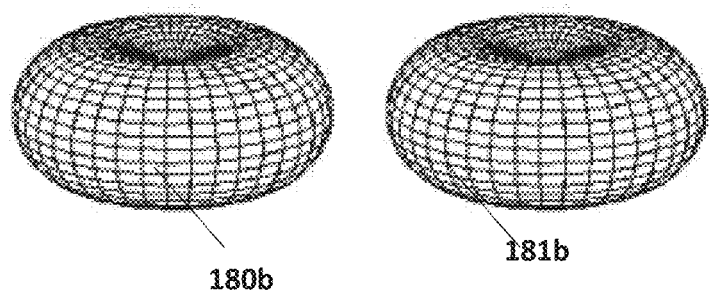

FIGS. 16A and 16B show a perspective view of same (FIG. 16B) and orthogonal (FIG. 16A) antenna polarizations.

With orthogonal polarization (FIG. 16A), less volume height for the antennas 180a, 181a is needed in the device (106 mm vs. 124 mm), better isolation is achieved when all antennas placed have orthogonally polarization, and better coverage of radiation pattern with 4× tilted (45 degree) antenna for each MIMO radio. However, the space of the PCB/heatsink might be limited due to antenna tilt inside the device.

Figure 17:
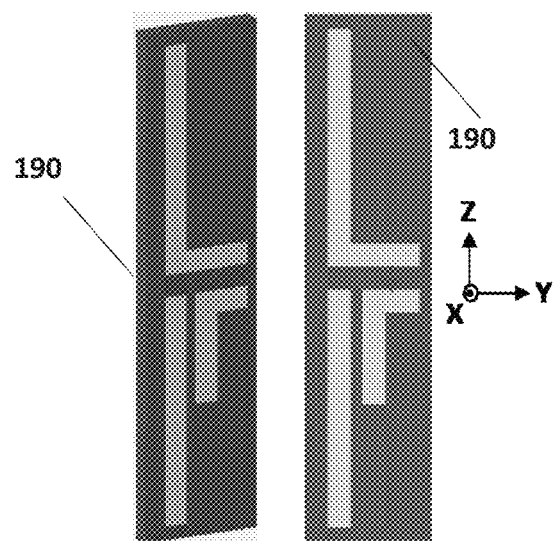
FIG. 17 shows a perspective view (left side of FIG. 17) and plane view (right side of FIG. 17) of a 5 GHz high band antenna.

With same polarization (FIG. 16B), the PCB/heatsink has more space due to antenna 180b, 181b fit on the inner wall of the device. However, more volume height is occupied for antennas in the device (124 mm V.S. 106 mm), there is worse isolation with all antennas placed under same polarization, and worse coverage of radiation pattern with 4× parallel antennas for each MIMO radio FIG. 17 shows a perspective view (left side of FIG. 17) and plane view (right side of FIG. 17) of a 5 GHz— high band antenna 190. The antenna is a narrow band antenna, in an embodiment made of FR4 with a size of 6×23×0.8 mm. The antenna is a high efficiency antenna having an omnidirectional radiation pattern.

Figure 18:
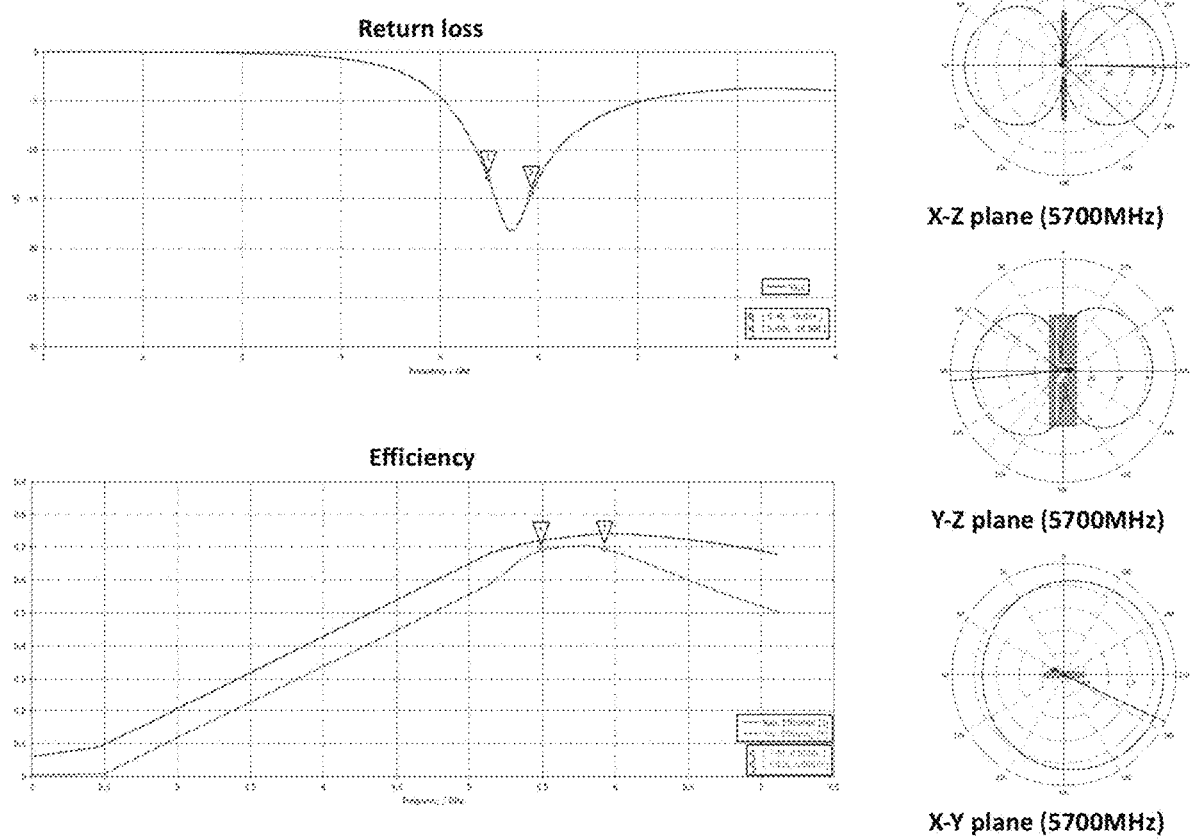
FIG. 18 shows graphic representations of 5 GHz high band antenna performance.
Figure 19:
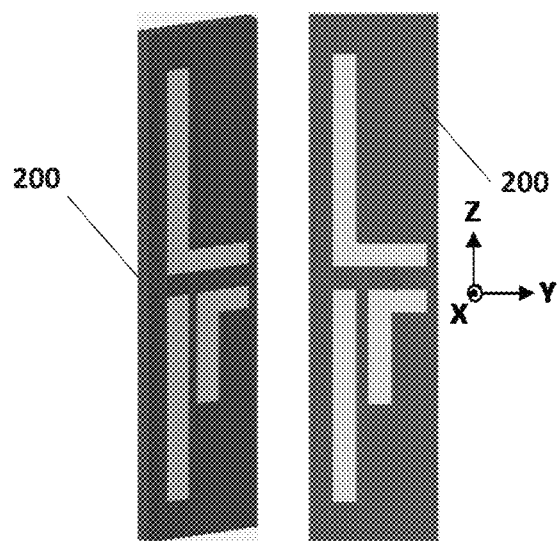
FIG. 19 shows a perspective view (left side of FIG. 19) and plane view (right side of FIG. 19) of a 6 GHz low band antenna.

FIG. 18 shows graphic representations of 5 GHz— high band antenna performance. Return loss and efficiency is graphed and the radiation pattern of the antenna is shown in the X-Y plane, Y-Z plane, and X-Y plane, all at 5700 MHz FIG. 19 shows a perspective view (left side of FIG. 19) and plane view (right side of FIG. 19) of a 6 GHz— low band antenna 200. The antenna is a narrow band antenna, in an embodiment made of FR4 with a size of 6×23×0.8 mm. The antenna is a high efficiency antenna having an omnidirectional radiation pattern.

Figure 20:
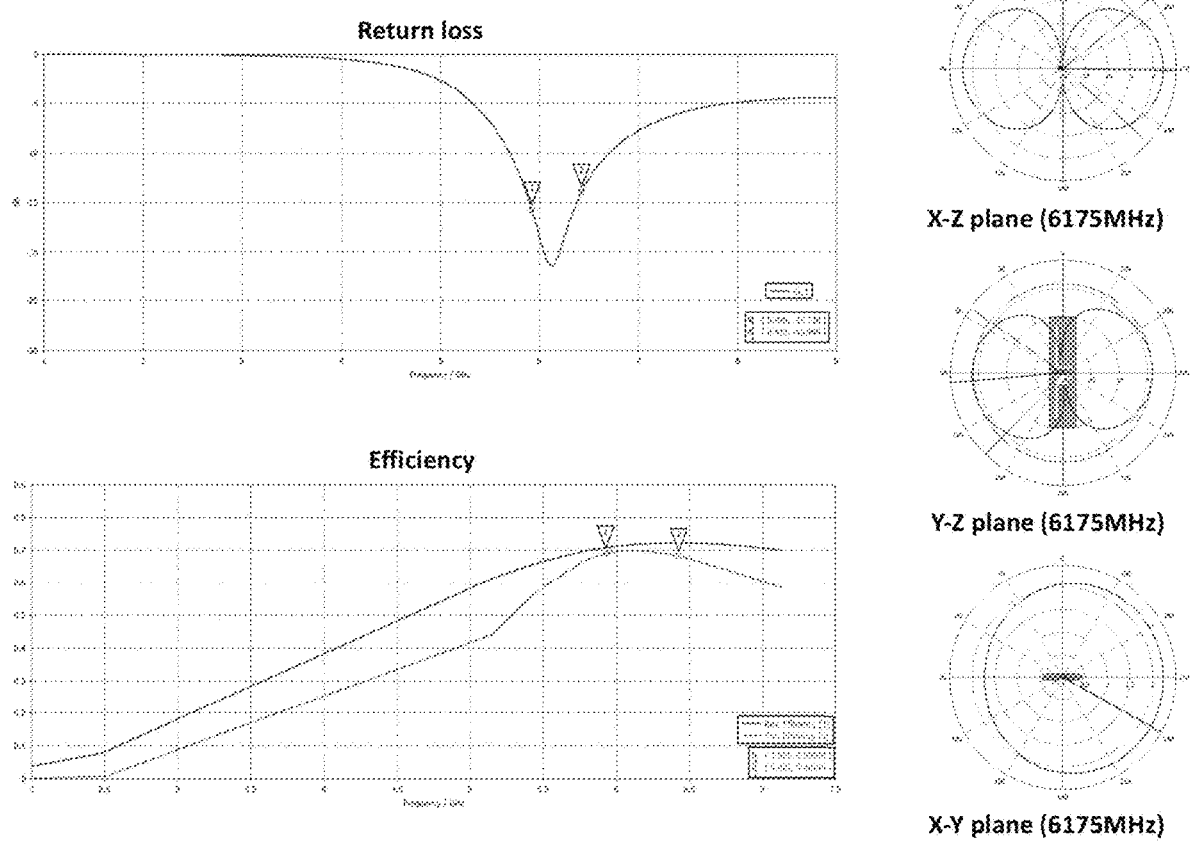
FIG. 20 shows graphic representations of 6 GHz low band antenna performance.
Figure 21:
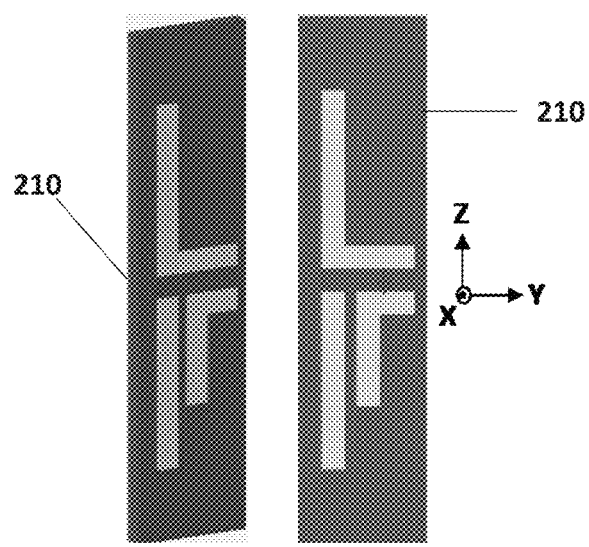
FIG. 21 shows a perspective view (left side of FIG. 21) and plane view (right side of FIG. 21) of a 6 GHz high band antenna.

FIG. 20 shows graphic representations of 6 GHz— low band antenna performance. Return loss and efficiency is graphed and the radiation pattern of the antenna is shown in the X-Y plane, Y-Z plane, and X-Y plane, all at 6175 MHz FIG. 21 shows a perspective view (left side of FIG. 21) and plane view (right side of FIG. 21) of a 6 GHz— high band antenna 210. The antenna is a narrow band antenna, in an embodiment made of FR4 with a size of 6×23×0.8 mm. The antenna is a high efficiency antenna having an omnidirectional radiation pattern.

Figure 22:
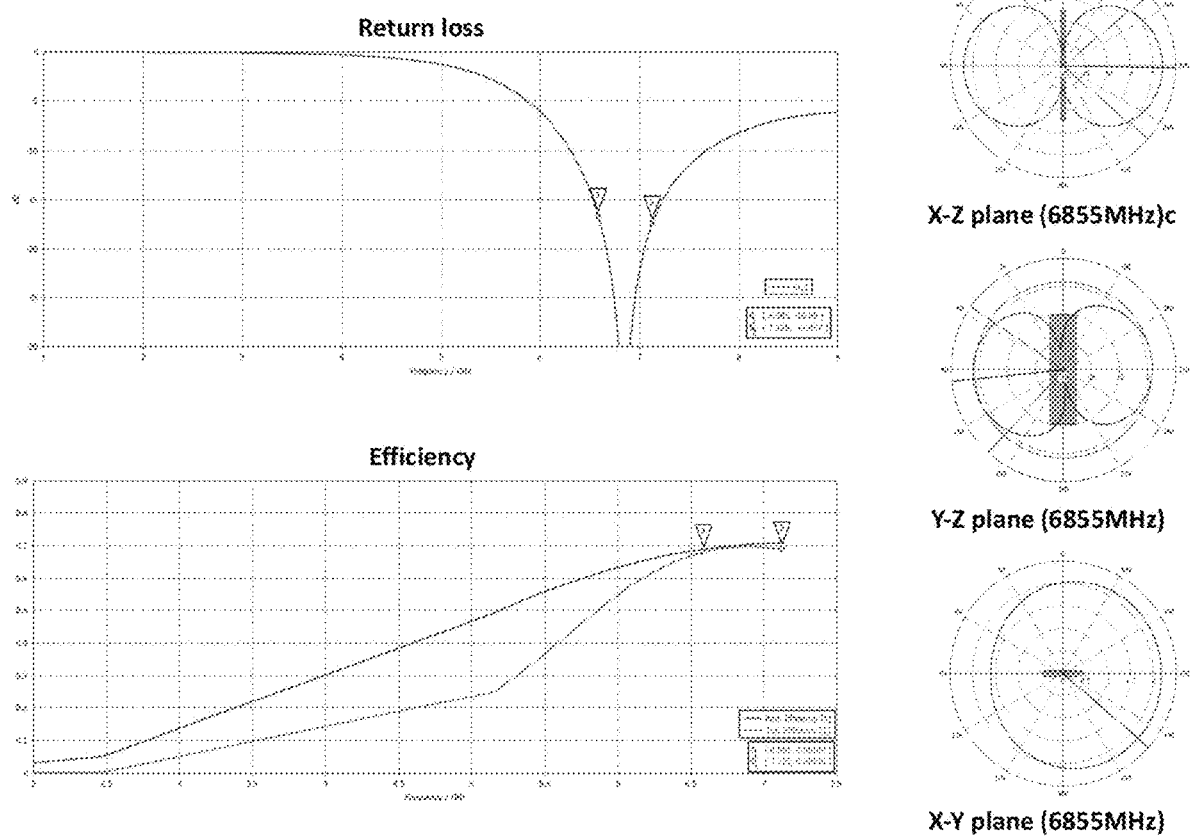
FIG. 22 shows graphic representations of 6 GHz high band antenna performance.
Figure 23:
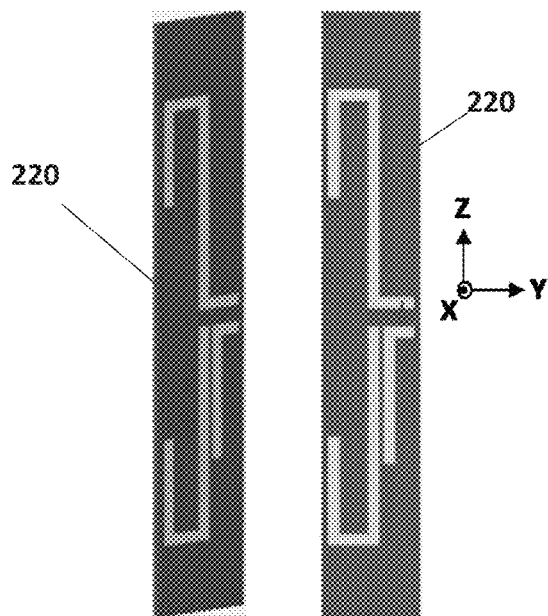
FIG. 23 shows a 2.4 GHz+5 GHz low band dual band antenna.

FIG. 22 shows graphic representations of 6 GHz— high band antenna performance. In FIG. 22, return loss and efficiency are graphed, and the radiation pattern of the antenna is shown in the X-Y plane, Y-Z plane, and X-Y plane, all at 6855 MHz FIG. 23 shows a perspective view (left side of FIG. 23) and plane view (right side of FIG. 23) of a 2.4 GHz+5 GHz— low band dual band antenna 220. The antenna is a narrow band antenna, in an embodiment made of FR4 with a size of 9×53×0.8 mm. The antenna is a high efficiency antenna having an omnidirectional radiation pattern.

Figure 24:
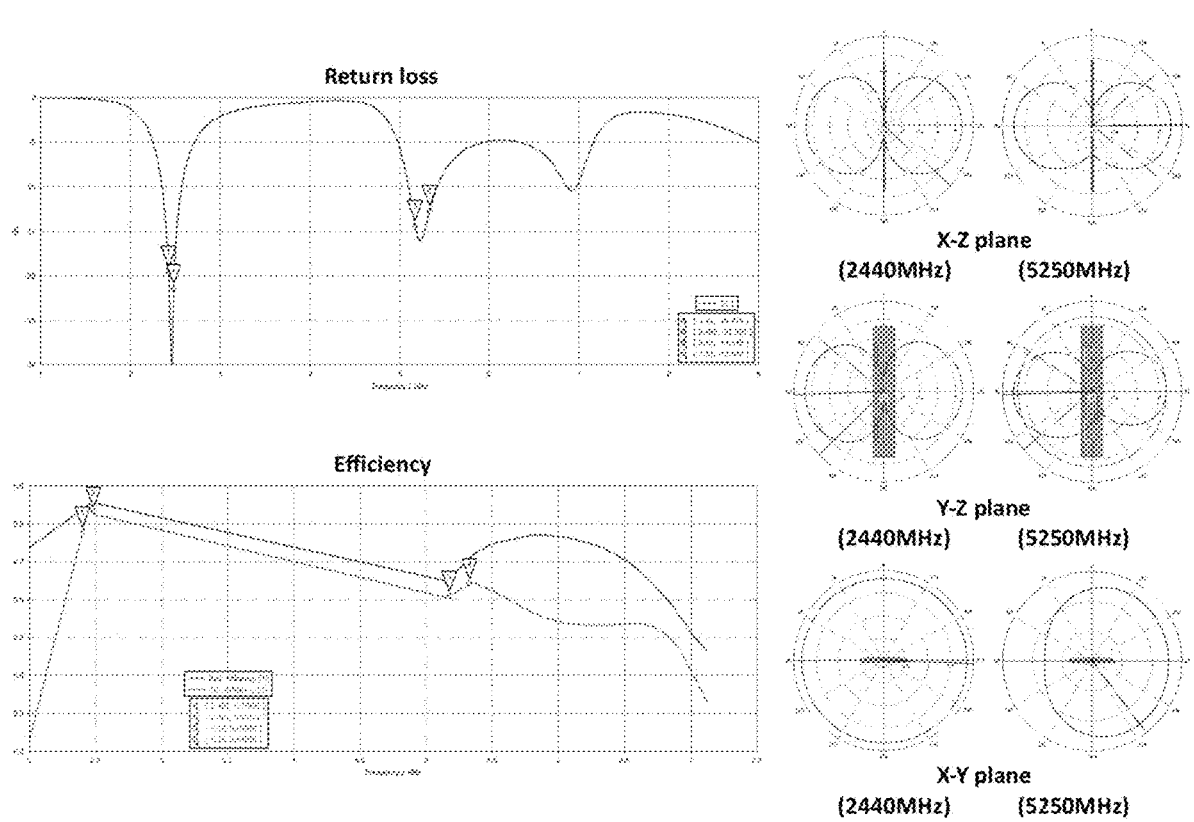
FIG. 24 shows graphic representations of 2.4 GHz+5 GHz low band dual band antenna performance.
Figure 25:
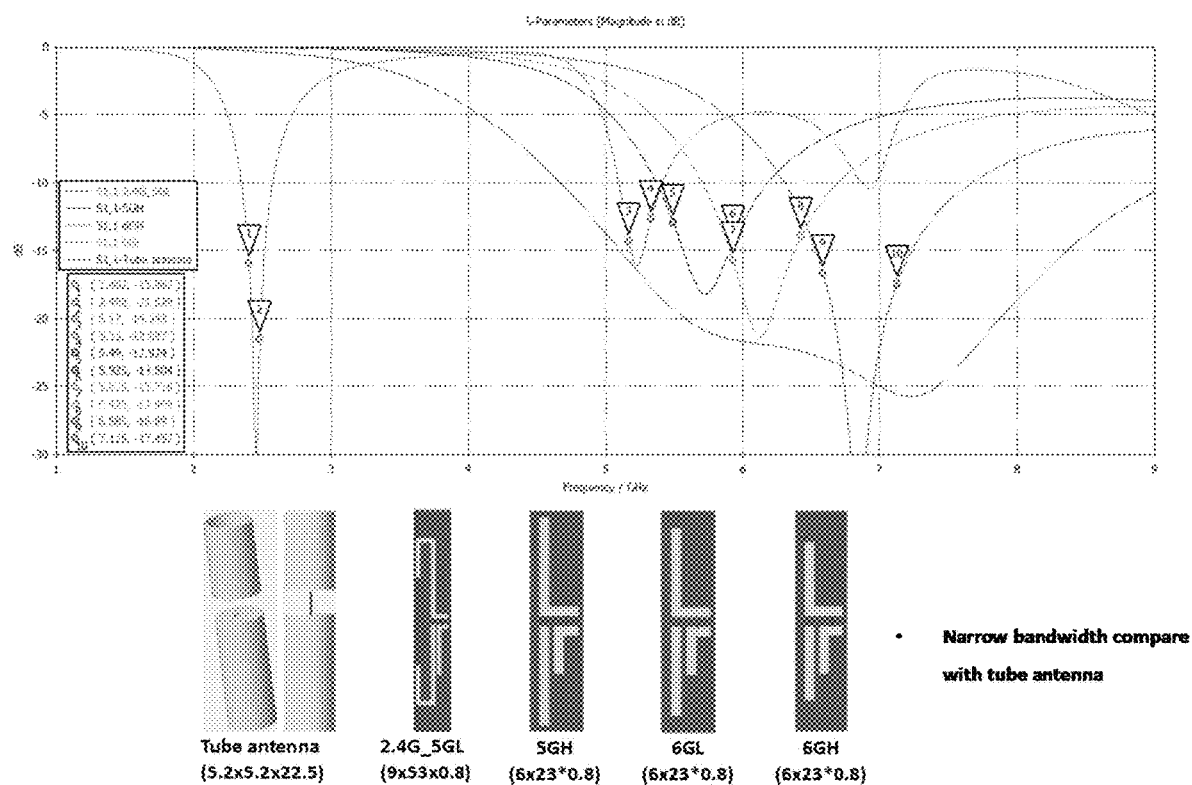
FIG. 25 shows an antenna return loss comparison for a prior art tube antenna, a 2.4 GHz+5 GHz low band dual band antenna, a 5 GHz high band antenna, a 6 GHz low band antenna, and a 6 GHz high band antenna.

FIG. 24 shows graphic representations of 2.4 GHz+5 GHz— low band dual band antenna performance. In FIG. 24, return loss and efficiency are graphed, and the radiation pattern of the antenna is shown in the X-Y plane, Y-Z plane, and X-Y plane, at both 2440 MHz and 5250 MHz FIG. 25 shows an antenna return loss comparison for a prior art tube antenna, a 2.4 GHz+5 GHz— low band dual band antenna, a 5 GHz— high band antenna, a 6 GHz— low band antenna, and a 6 GHz— high band antenna.

Figure 26:
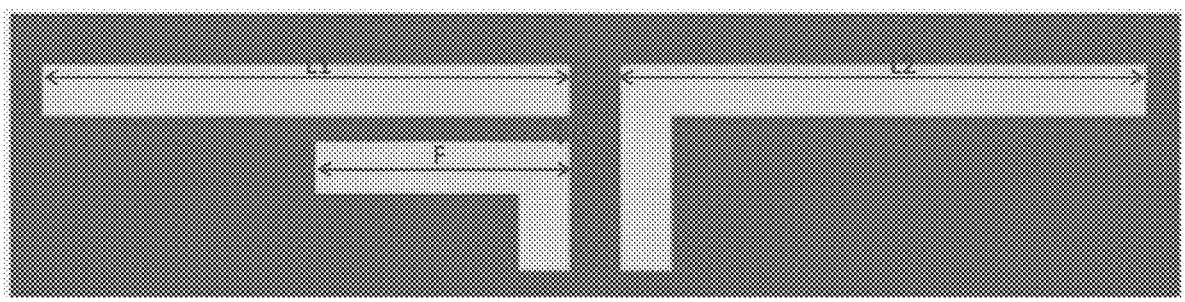
FIG. 26 shows coupling feed unbalance in a dipole antenna in accordance with embodiments of the invention.

FIG. 26 shows coupling feed unbalance in a dipole antenna in accordance with embodiments of the invention. The parameter of "F" and "G" can control the impedance matching and the bandwidth of the antenna. The parameter of "L1" and "L2" can control the resonated frequency of the antenna.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A network node, comprising:
a plurality of radio modules, each of said modules simultaneously operable with each other radio module, each of said radio modules communicating via a communications band that is different from each other of said radio modules;
said radio modules comprising collectively at least two backhauls;
a controller for controlling throughput of said node by selectably configuring each of said two backhauls as any of a backhaul and a fronthaul;
said controller operable to increase throughput by aggregating said at least two backhauls;
said controller operable to optimize hardware quality-of-service (QoS) by splitting traffic flows for said at least two backhauls between low latency and data applications; and
said controller operable to optimize network coverage by dynamically assigning said at least two backhauls, wherein unused backhauls are configured as fronthauls.

2. The network node of claim 1, further comprising:
five radio modules, each module operating on a different one of five communications bands.

3. The network node of claim 2, said communications bands comprising:
a 2.4 GHz band;
a 5 GHz low band;
a 5 GHz high band;
a 6 GHz low band; and
a 6 GHz high band.

4. The network node of claim 1, further comprising:
said radio modules configurable for coordinated operation to provide multiband routing for any of three traffic dispatching scenarios.

5. The network node of claim 4, wherein said traffic dispatching scenarios comprise:
a high-performance mode which provides high performance between any connected nodes in a network that have at least two backhauls therebetween by aggregating both backhauls from each of the network nodes;
wherein traffic is either equally dispatched by, or based on selective traffic flow between, said at least two backhauls;
wherein low latency packets are routed with priority and assured to avoid packets getting dropped; and
wherein data packets are routed with allowing random packet dropping when resources limited or congested.

6. The network node of claim 4, said traffic dispatching scenarios comprise:
a mid-performance mode between any connected nodes in a network that have at least two backhauls therebetween;
wherein a first backhaul is configured as a backhaul; and
wherein a second backhaul is configured as a fronthaul to extend network coverage.

7. The network node of claim 4, said traffic dispatching scenarios comprise:
a coverage extension mode between any connected nodes in a network that have at least two backhauls therebetween in which network operation is optimized for maximum range while throughput is reduced by selective backhaul and fronthaul operation;
wherein only one selective backhaul is available;
wherein low latency packets are routed with priority and assured to avoid packets being dropped; and
wherein data packets are routed with allowing random packet dropping when resources limited or congested.

8. The network node of claim 1, further comprising:
an I/O interface;
a network processing unit (NPU) connected to each network node module via a PCIe bus;
said network node further comprising a corresponding RF front end that includes a power amplifier, low noise amplifier, and at least one band pass filter.

9. The network node of claim 8, further comprising:
a diplexer that combines two bands to use one set of antennas for both bands.

10. The network node of claim 1, further comprising:
means for preventing interference between said radio modules.

11. The network node of claim 10, said means for preventing interference between said radio modules comprising any of:
a mounting scheme that physically isolates each of said radio modules from each other;
an isolated heatsink associated with each of said radio modules;
a separate, isolated power supply associated with each of said radio modules;
one or more high selectivity filters associated with each of said radio modules;
a narrow band receive low noise amplifier associated with each of said radio modules;
a narrow band transmit power amplifier associated with each of said radio modules;
isolated antenna cable routing associated with each of said radio modules;
a narrow band antenna associated with each of said radio modules; and
a coexistence bus.

12. The network node of claim 11, wherein each radio module is mounted separately; and
wherein each radio is connected to a main board through a connector to isolate each radio as a separate module.

13. The network node of claim 11, wherein said heatsinks are placed on opposite sides of respective radio module circuit boards in a staggered fashion to avoid energy radiated by one radio's heatsink interfering with the operation of another radio.

14. The network node of claim 11, wherein each radio has its own respective power supply connected to a common power source;
wherein each said power supply operates separately from each other said power supply.

15. The network node of claim 11, further comprising:
a narrow bandwidth tuned circuit in a transmit power amplifier path and tuned circuits in a receive low noise amplifier path.

16. The network node of claim 15, wherein said tuned circuits are provided in the transmit and receive amplifier paths for each band for additional cross talk rejection between each of said bands.

17. The network node of claim 10, said means for preventing interference between said radio modules further comprising:
cable isolation, wherein cables for each radio module are positioned away from cables for each of the other radio modules.

18. The network node of claim 1, wherein said controller configures concurrent multi-band operation in a STAR network, where TPUT=TPUT 1+TPUT 2; and
wherein two backhauls operate simultaneously between any two network nodes.

19. The network node of claim 1, wherein said controller configures concurrent multi-band operation in a DAISY network, where TPUT=TPUT 1+TPUT 2; and
wherein two backhauls operate simultaneously between any three network nodes.

20. The network node of claim 1, wherein said controller configures a QoS based backhaul STAR network;
wherein two backhauls connect to a spreading node;
wherein said two backhauls are split;
wherein a first backhaul is configured for low latency applications to other backhauls; and
wherein a second backhaul is configured for DATA applications.

21. The network node of claim 1, wherein said controller configures a QoS based backhaul DAISY network;
wherein a first backhaul uses lower latency throughout the DAISY network; and
wherein a second backhaul is used for DATA applications throughout the DAISY network.

22. The network node of claim 1, wherein said controller configures a selective backhaul STAR network configured for coverage;
wherein for a first network node a first backhaul is dedicated to a second network node and a second backhaul is dedicated to a third network node; and
wherein said second and third network nodes each dedicate a first backhaul to said first node, and wherein said second and third network nodes each use a second backhaul as a fronthaul.

23. The network node of claim 1, wherein said controller configures selective backhaul DAISY network configured for coverage;
  wherein each network node uses a backhaul as a fronthaul.

24. The network node of claim 1, said controller comprising:
  a network processing unit (NPU) for:
    classifying fronthaul traffic type using any of Mirror Stream Classification Service (MSCS), Type of Service (TOS) field in IP packet headers/Diffserv Code Point (DSCP), and Deep Packet Inspection (DPI);
    adapting different control mechanisms based on satellite placement scenarios (High Performance, Mid Performance, Coverage Extension); and
    controlling system wide parameters to route traffic into different backhauls with priority.

25. The network node of claim 24, wherein said network processing unit (NPU) performs deep packet inspection on incoming packets to determine whether a packet is from a real time application or a data center application;
  wherein when a packet is received from a data center application it is routed to a backhaul that is dedicated to DATA transfer; and
  wherein when a packet is received from a real time application it is routed to a backhaul that is dedicated to low latency applications.

26. The network node of claim 25, wherein said network processing unit (NPU) selects maximum throughput wherein, when said network nodes are close to each other, for each network node each packet is routed through two backhauls at the same time without segregation of data.

27. The network node of claim 24, wherein said network processing unit (NPU) executes one or more traffic dispatching scenarios comprising:
  a high performance aggregated backhaul in which a first and a second backhaul each dispatch low latency real time applications and data center applications;
  a midperformance QoS based backhaul in which a first backhaul dispatches low latency real time applications, and in which a second backhaul dispatches data center applications; and
  a coverage extension selective backhaul in which a first and a second backhaul each dispatch low latency real time applications and data center applications.

28. The network node of claim 1, further comprising:
  a plurality of narrow band, orthogonally polarized antennas by which said radio modules send and receive signals over respective communications bands.

* * * * *